US008721236B2

(12) United States Patent
Kazda et al.

(10) Patent No.: US 8,721,236 B2
(45) Date of Patent: May 13, 2014

(54) POWER TOOL ARBOR DEVICE

(75) Inventors: Austin J. Kazda, Wauwatosa, WI (US);
Michael S. Steele, Waukesha, WI (US);
Douglas W. Allen, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 790 days.

(21) Appl. No.: 12/910,544

(22) Filed: Oct. 22, 2010

(65) Prior Publication Data
US 2011/0097169 A1 Apr. 28, 2011

Related U.S. Application Data

(60) Provisional application No. 61/254,548, filed on Oct. 23, 2009.

(51) Int. Cl.
*B27B 5/12* (2006.01)
*B23B 51/04* (2006.01)

(52) U.S. Cl.
CPC .................... *B23B 51/0473* (2013.01)
USPC ....................... 408/239 R; 408/204

(58) Field of Classification Search
USPC .............. 271/141; 408/204, 238, 240, 239 R; 411/432; 279/8, 141; 451/358, 461, 451/360; 403/322.2, 325
See application file for complete search history.

(56) References Cited

U.S. PATENT DOCUMENTS

| 5,177,905 A * | 1/1993 | Takahashi et al. ............ 451/342 |
| 5,246,317 A | 9/1993 | Koetsch et al. |
| 5,388,942 A * | 2/1995 | Bonacina et al. ............. 411/432 |
| 5,417,527 A | 5/1995 | Wienhold |
| 5,447,397 A | 9/1995 | Asano |
| 6,887,018 B2 * | 5/2005 | Ostermeier .................... 408/204 |
| 6,966,730 B1 | 11/2005 | Miyanaga |
| 7,104,738 B2 | 9/2006 | Cantlon |
| 7,112,016 B2 | 9/2006 | Nordlin |
| 7,517,179 B2 * | 4/2009 | Miller et al. .................. 408/204 |
| 2002/0122703 A1 | 9/2002 | Czyzewski et al. |
| 2007/0269280 A1 | 11/2007 | Vasudeva et al. |
| 2008/0118316 A1 | 5/2008 | Miller et al. |
| 2008/0253851 A1 | 10/2008 | Miller et al. |
| 2008/0253852 A1 | 10/2008 | Miller et al. |
| 2008/0254725 A1 | 10/2008 | Henning et al. |
| 2008/0260481 A1 | 10/2008 | Omi et al. |
| 2010/0239381 A1* | 9/2010 | Kelleher ....................... 408/204 |

* cited by examiner

*Primary Examiner* — Andrea Wellington
*Assistant Examiner* — Mohammad Nourbakhsh
(74) *Attorney, Agent, or Firm* — Michael Best & Friedrich LLP

(57) ABSTRACT

A power tool arbor assembly includes an arbor; an actuating member located at a second end of the arbor; and a friction member located at the second end of the arbor, the friction member being axially movable along the second end of the arbor. The friction member has a first axial position when no power tool accessory is attached to the second end of the arbor, the friction member being moveable toward a first end of the arbor from the first axial position to a second axial position in response to contact between the power tool accessory and the friction member, and the friction member being moveable toward the first end of the arbor from the second axial position to a third axial position when the actuating member is actuated.

21 Claims, 27 Drawing Sheets

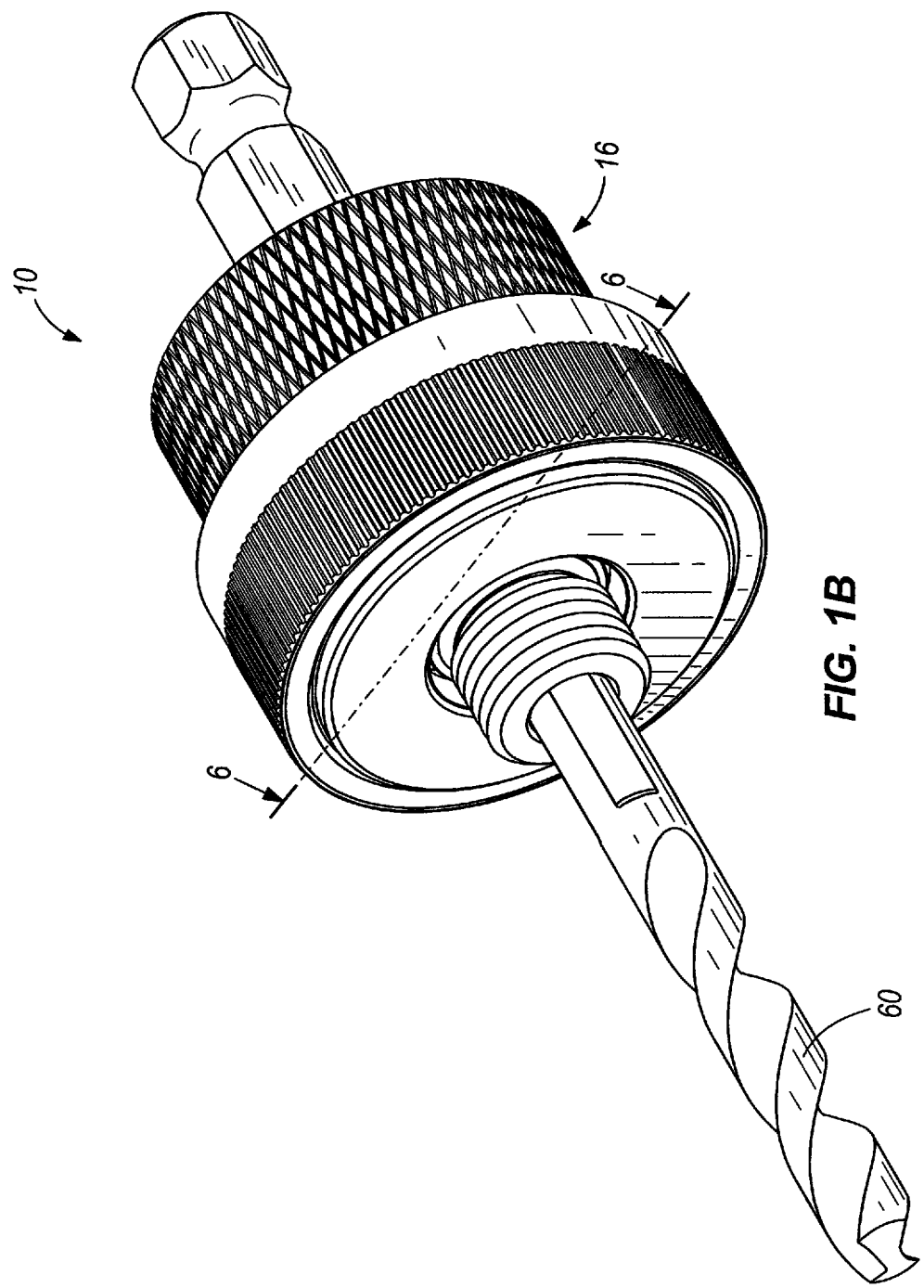

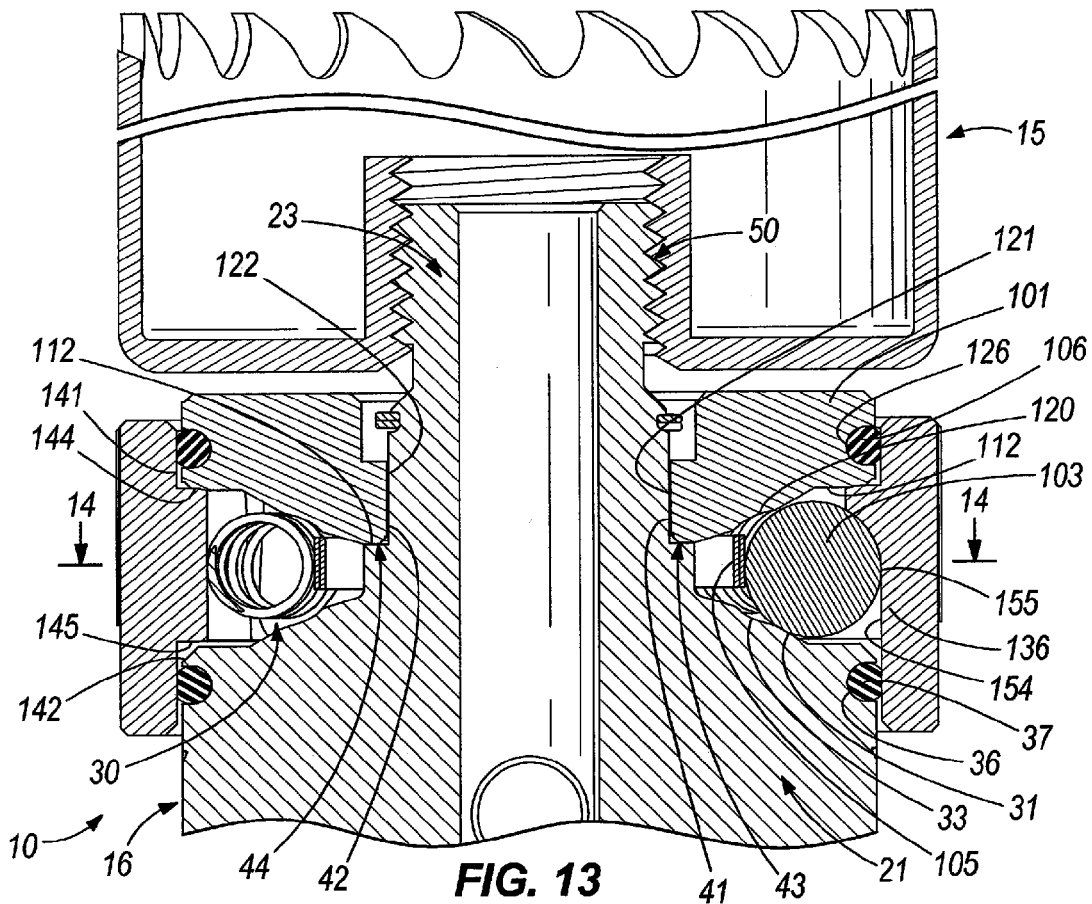
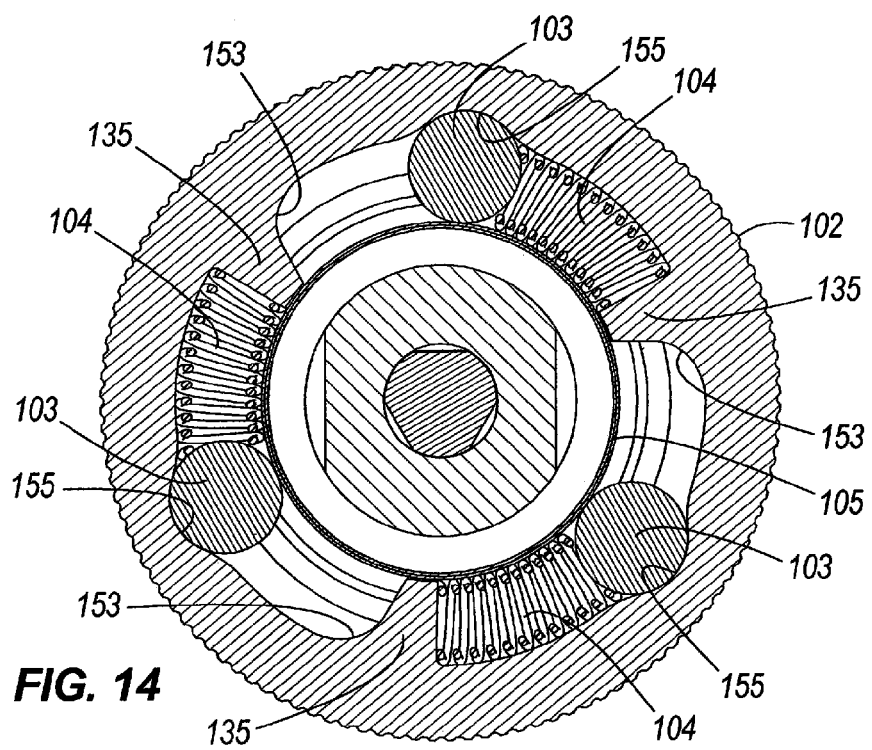

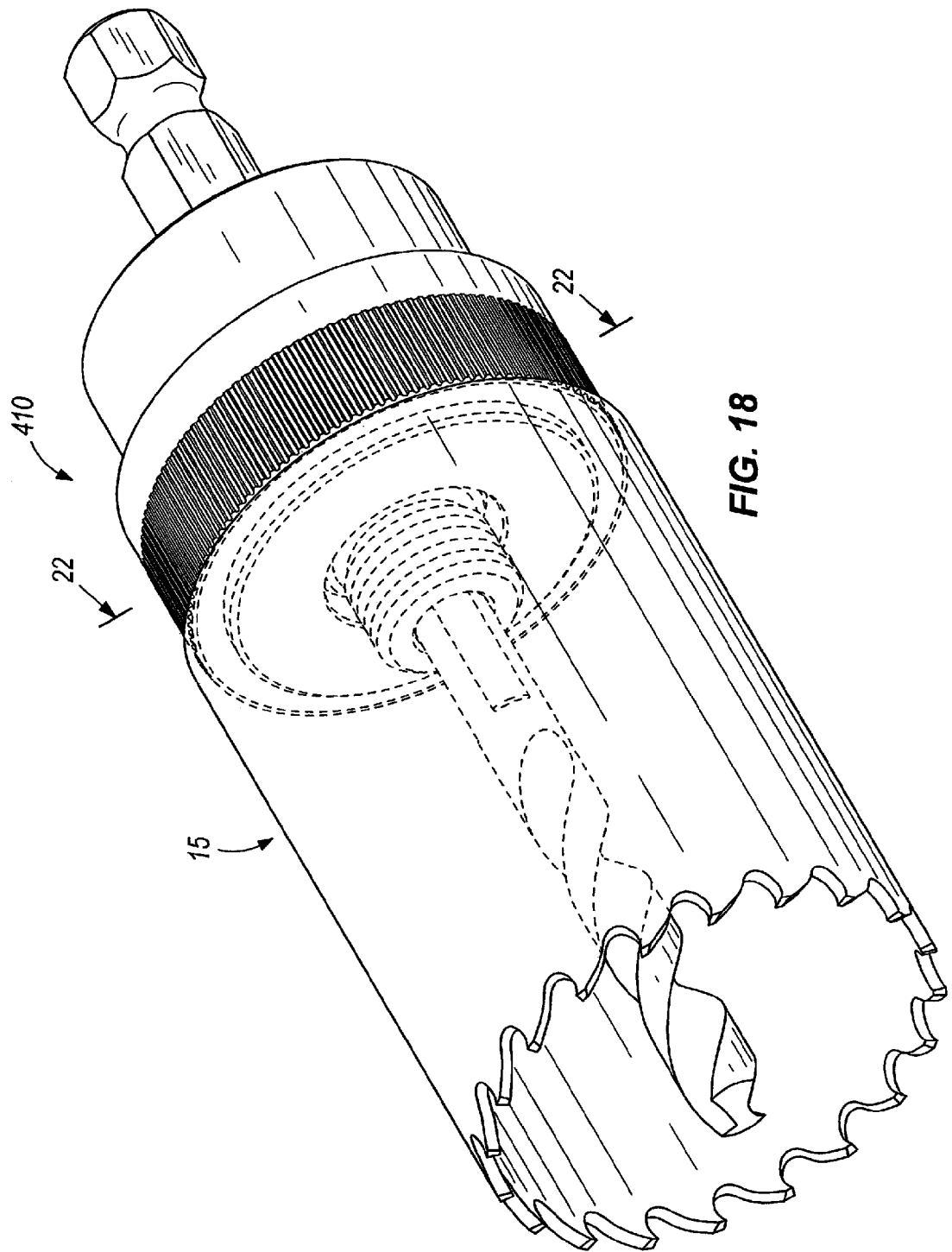

POWER TOOL ARBOR DEVICE

RELATED APPLICATIONS

This patent application claims the benefit of prior filed U.S. Provisional Patent Application No. 61/254,548 filed Oct. 23, 2009, the entire contents of which are hereby incorporated by reference.

BACKGROUND OF THE INVENTION

The present invention relates to power tools, and more particularly, to a quick change arbor device for power tools.

Rotary power tool accessories such as hole saws, grinding wheels, and wire brushes are typically threaded onto an arbor, or mandrel, for use with a rotating power tool, such as a drill. In use, the rotary power tool accessories are often further tightened onto the arbor such that it is difficult to remove the power tool accessory from the arbor when finished. This is particularly true if a substantial amount of torque is transmitted by the rotating power tool through the attached arbor to the power tool accessory as the power tool accessory engages a work piece.

SUMMARY OF THE INVENTION

In one embodiment, the invention provides a power tool arbor assembly comprising an arbor having a body with an axis, a first end adapted to couple with a rotating tool and a second end for attaching a power tool accessory; an actuating member located at the second end of the arbor; and a friction member located at the second end of the arbor, the friction member including a first surface for contacting a surface of the power tool accessory and the friction member being axially movable along the second end of the arbor, wherein the friction member has a first axial position when no power tool accessory is attached to the second end of the arbor, the friction member being moveable toward the first end of the arbor from the first axial position to a second axial position in response to contact between the surface of the power tool accessory and the first surface of the friction member, and the friction member being moveable toward the first end of the arbor from the second axial position to a third axial position when the actuating member is actuated.

In another embodiment, the invention provides a power tool arbor assembly comprising an arbor having a body with an axis, a first end adapted to couple with a rotating tool, and a second end for attaching a power tool accessory; an actuating member located at the second end of the arbor; and a friction member located at the second end of the arbor, the friction member including a first surface for contacting a surface of the power tool accessory and the friction member being axially movable along the second end of the arbor, wherein the actuating member has a first position when no power tool accessory is attached to the second end, the actuating member being axially moveable toward the first end from the first position to a second position in response to contact between the surface of the power tool accessory and the first surface, and the actuating member is movable from the second position to a third position.

In a further embodiment, the invention provides a power tool arbor assembly comprising an arbor having a body defining a longitudinal axis, a first end adapted to couple with a rotating tool and a second end for attaching a power tool accessory; an actuating member located at the second end of the arbor, the actuating member including an inner surface defining a cavity and a tang extending radially inward towards the body; a friction member located at the second end of the arbor, the friction member including a first surface for contacting a surface of the power tool accessory when the accessory is coupled to the arbor and the friction member being axially movable along the second end of the arbor; a roller element positioned between the actuating member and the second end of the arbor; a first spring positioned about the second end of the arbor, the first spring biasing the roller element radially away from the longitudinal axis of the body; and a second spring positioned within the cavity of the actuating member, the second spring seated between the tang and the roller element and biasing the roller element away from the tang, wherein the power tool assembly has a first state when a power tool accessory is removed from the second end of the arbor, the power tool assembly has a second state when the power tool accessory is coupled to the second end of the arbor, wherein in the second state the friction member and the actuating member are moved towards the first end of the arbor in response to contact between the surface of the power tool accessory and the first surface of the friction member, and the power tool assembly has a third state when the actuating member is actuated by a user, wherein in the third state the first spring biases the roller element into the cavity of the actuating member, which permits further axial movement of the friction member towards the first end of the arbor such that the friction member is moved out of contact with the power tool accessory.

Other aspects of the invention will become apparent by consideration of the detailed description and accompanying drawings.

BRIEF DESCRIPTION OF THE DRAWINGS

FIG. 1B is a perspective view of the power tool arbor system of FIG. 1A, with the hole saw removed.

FIG. 13 is a cross-section view of the power tool arbor system of FIG. 12, with an attached hole saw.

FIG. 14 is a transverse cross-section view of the power tool arbor system of FIG. 12 taken along line 14-14 in FIG. 13.

FIG. 18 is an perspective view of a power tool arbor system, with an attached hole saw, according to another embodiment of the invention.

Figure 1A:
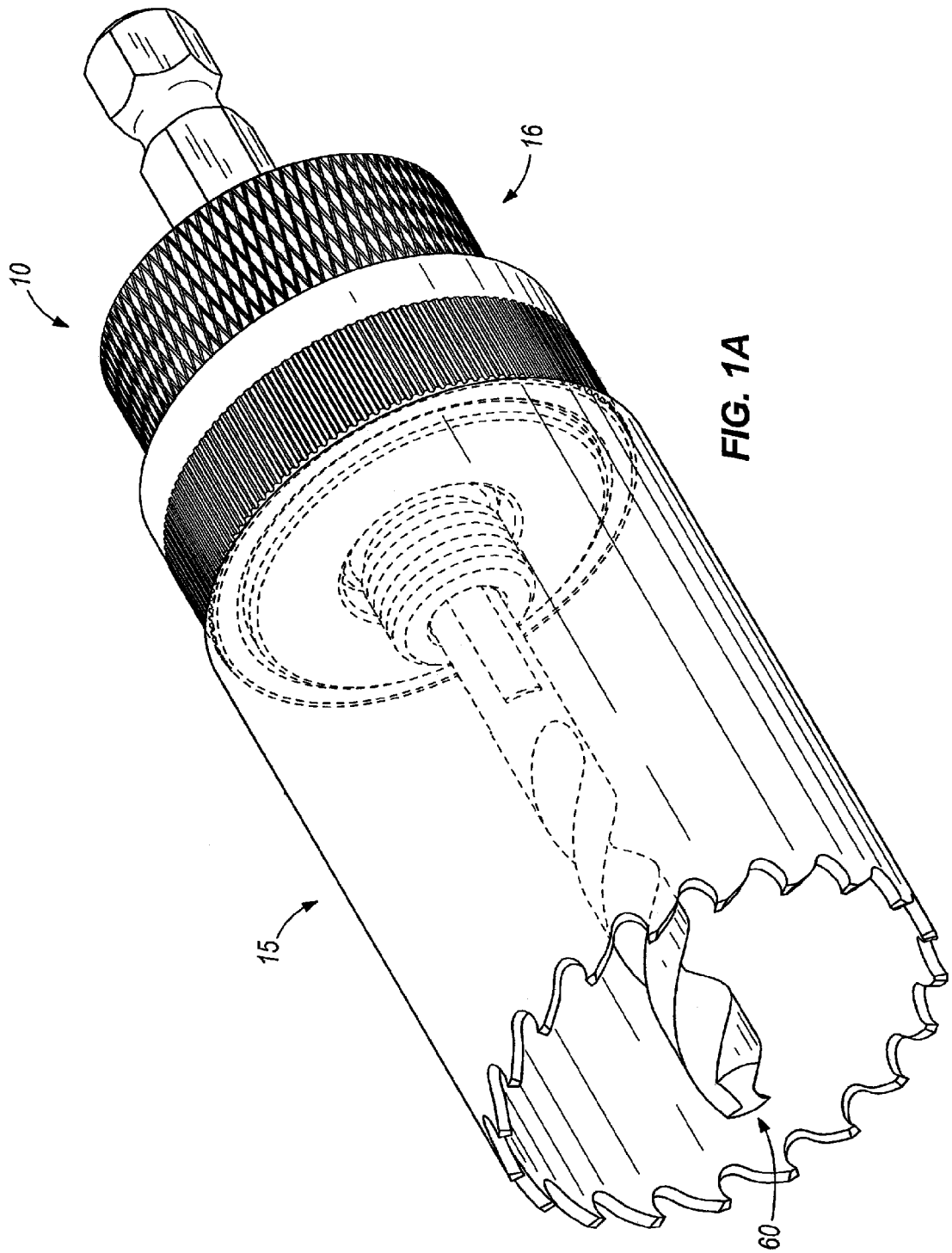
FIG. 1A is a perspective view of a power tool arbor system, with an attached hole saw, according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1A, 1B, 2, 3A and 3B illustrate a power tool arbor system or device 10 for use with a power tool accessory 15, which is a hole saw in the illustrated embodiment. The disclosed power tool arbor system 10 includes a quick release mechanism for facilitating the removal of a hole saw from an arbor after use. Hole saws are typically threaded onto an arbor, or mandrel, for use with a rotating power tool, such as a drill. In use, the hole saw is further tightened onto the arbor, such that it is often difficult to remove the hole saw from the arbor when finished. The arbor system 10 disclosed herein, includes an arbor 16 and a release mechanism 17 to facilitate removal of the power tool accessory 15 from the arbor 16 after use. The arbor system 10 further includes a bore 24 (FIG. 3A) for receiving another power tool accessory 60, which is a pilot drill in the illustrated embodiment.

Figure 3A:
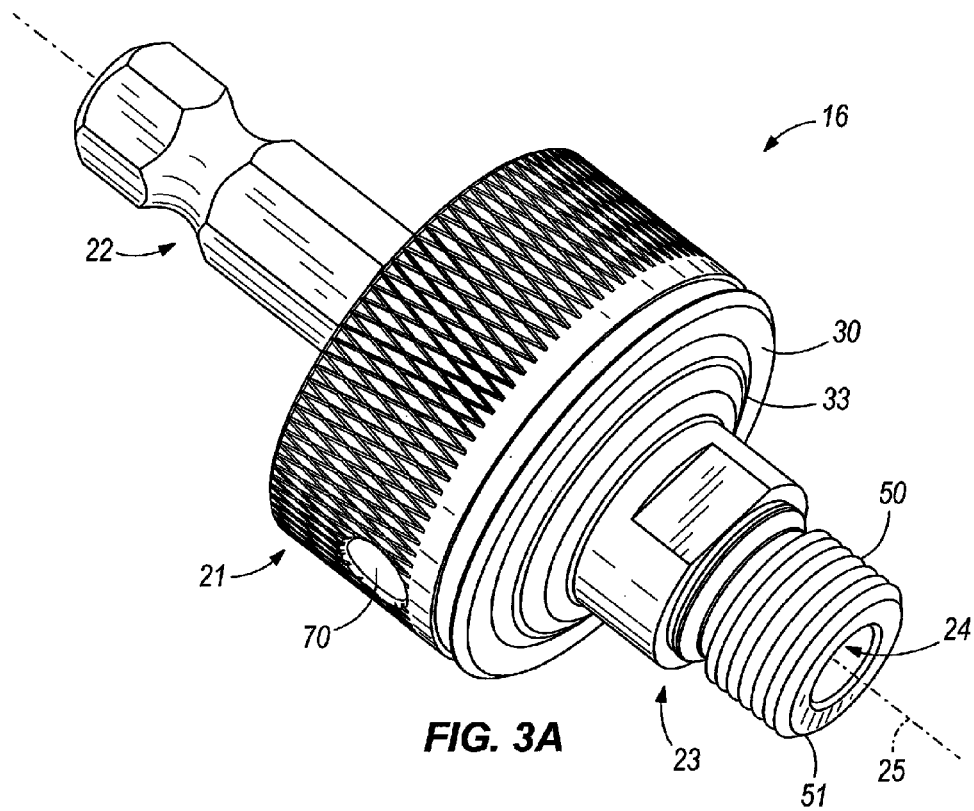
FIGS. 3A and 3B are views of an arbor of the power tool arbor system shown in FIG. 1A.
Figure 3B:
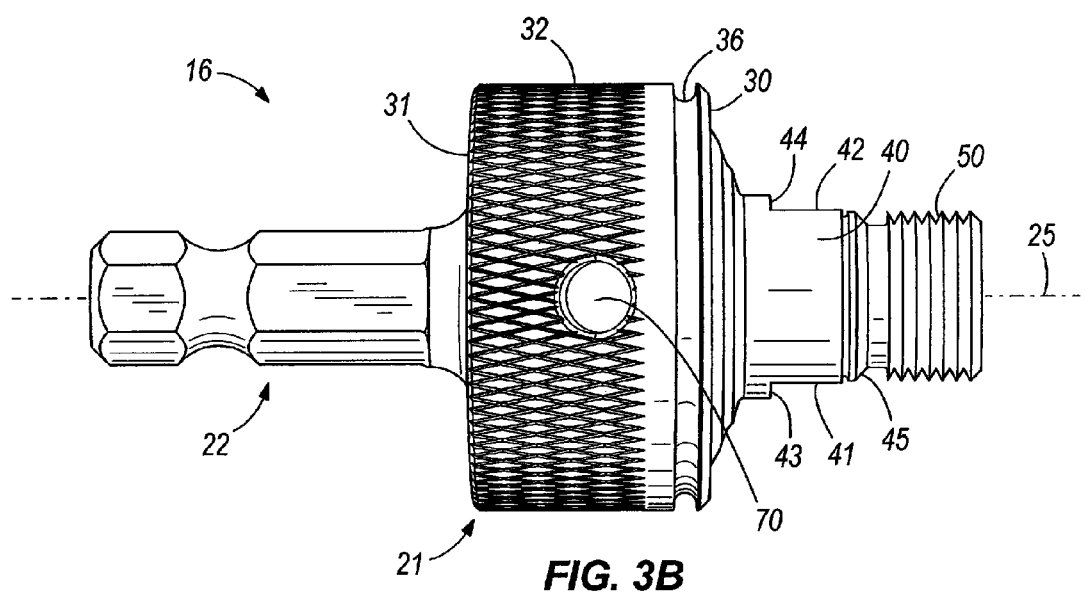

Referring to FIGS. 3A and 3B, the arbor 16 includes a body 21, a first projecting end 22 extending from the body 21, a second projecting end 23 extending from the body 21, and the bore 24 extending through at least the body 21 and the second projecting end 23. The body 21, the projecting ends 22, 23, and the bore 24 share a common rotation axis 25. The first projecting end 22 is adapted for coupling with a rotating tool (not shown), such as a drill, and in the illustrated embodiment has a hexagonal profile for coupling with a chuck assembly of the rotating tool.

The arbor body 21 has an overall cylindrical shape, and includes a bearing surface 30, a base surface 31 opposite the bearing surface 30, and an outer peripheral surface 32. The bearing surface 30 is substantially perpendicular to the rotation axis 25 and includes a raceway or groove 33. The base surface 31 is substantially parallel to the bearing surface 30. The peripheral surface 32 extends between the bearing surface 30 and the base surface 31. In the illustrated embodiment, the exterior surface 32 is partially knurled to facilitate gripping by a user. In another embodiment, the exterior surface 32 may include a textured surface or coating. A groove 36 is formed in the peripheral surface 32, and is adapted to receive a sealing element 37 (FIG. 2), such as an O-ring.

The second projecting end 23 of the arbor 16 extends from the bearing surface 30 of the body 21 and includes a cylindrical portion 40. The portion 40 includes a first planar surface 41 and a second planar surface 42 to inhibit rotation of the arbor 16 relative to a mating part (i.e., a friction member 101 in the illustrated embodiment). In the illustrated embodiment, the first surface 41 is generally parallel to the second surface 42, and the surfaces 41, 42 are located on opposing sides of the portion 40. The projecting end 23 includes a first shoulder 43 and a second shoulder 44 extending between the cylindrical portion 40 and the first surface 41 and the second surface 42, respectively. The third surface 43 and the fourth surface 44 are coplanar and are oriented substantially perpendicular to the first surface 41 and the second surface 42. Although the portion 40 is cylindrical in the illustrated embodiment, in further embodiments the portion may have other profiles to inhibit rotation of the arbor 16 relative to mating parts.

The projecting end 23 includes a circumferential groove 45 formed therein for receiving a retention device 48 (FIG. 2), such as a retaining ring. The second projecting end 23 further includes a threaded end 50, which extends from the groove 45 and threadably couples the power tool accessory 15 to the arbor 16, and an end surface 51. The bore 24 of the arbor 16, which is axially aligned with the rotation axis 25, extends through the end surface 51 of the end 50 into the body 21. The body 21 includes an aperture 70 extending through the peripheral surface 32 to the bore 24. The aperture 70 receives a fastener 71 (FIG. 2) that retains the pilot drill 60 in the bore 24.

Figure 2:
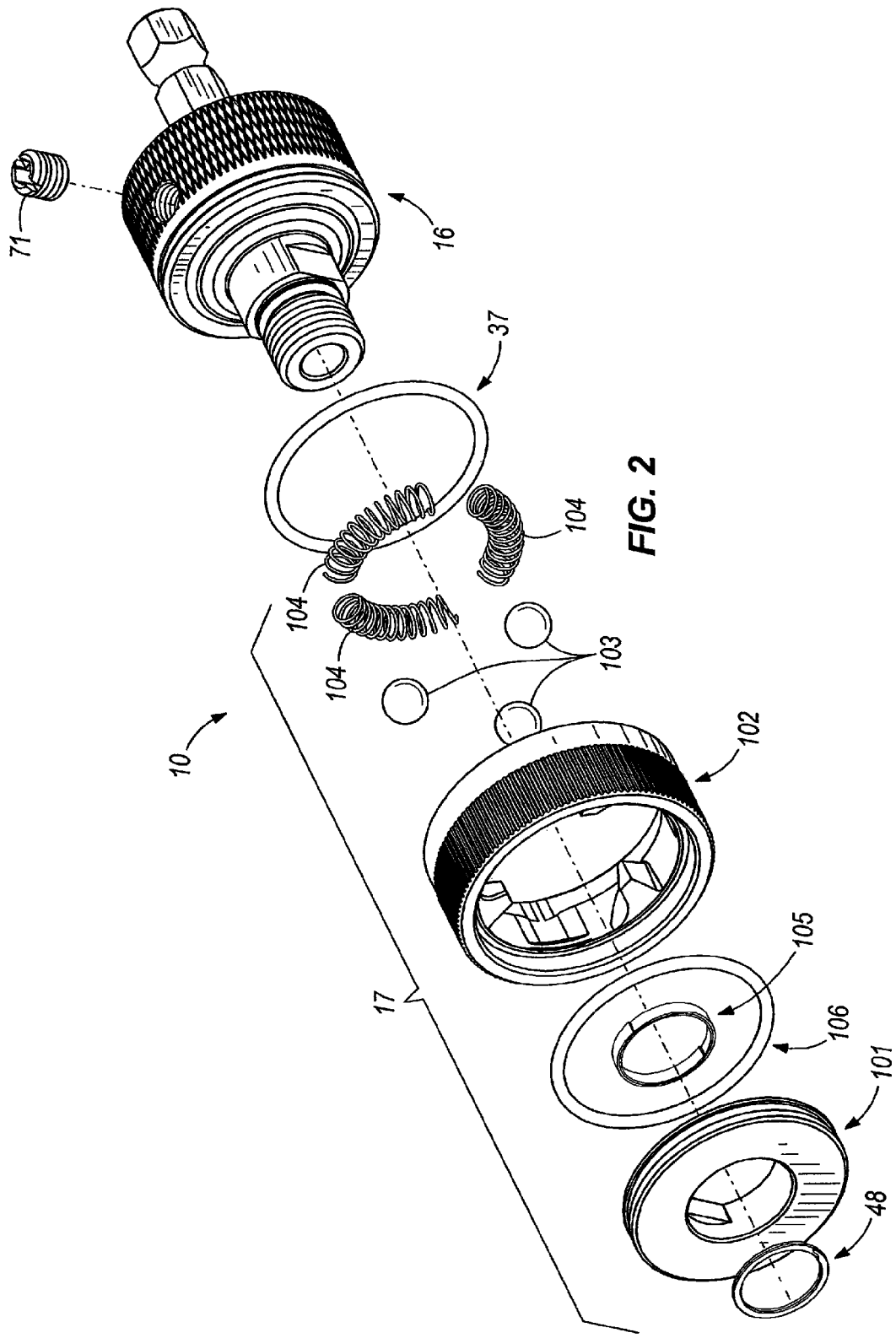
FIG. 2 is an exploded view of the power tool arbor system of FIG. 1A.

Referring to FIG. 2, the release mechanism 17 includes a friction member 101, an actuating member or collar 102, roller elements 103, spring elements 104, a radially acting spring 105, and a sealing element 106. The release mechanism assembly 17 is located on the arbor 16 and retained axially with the retention device 48.

Figure 4A:
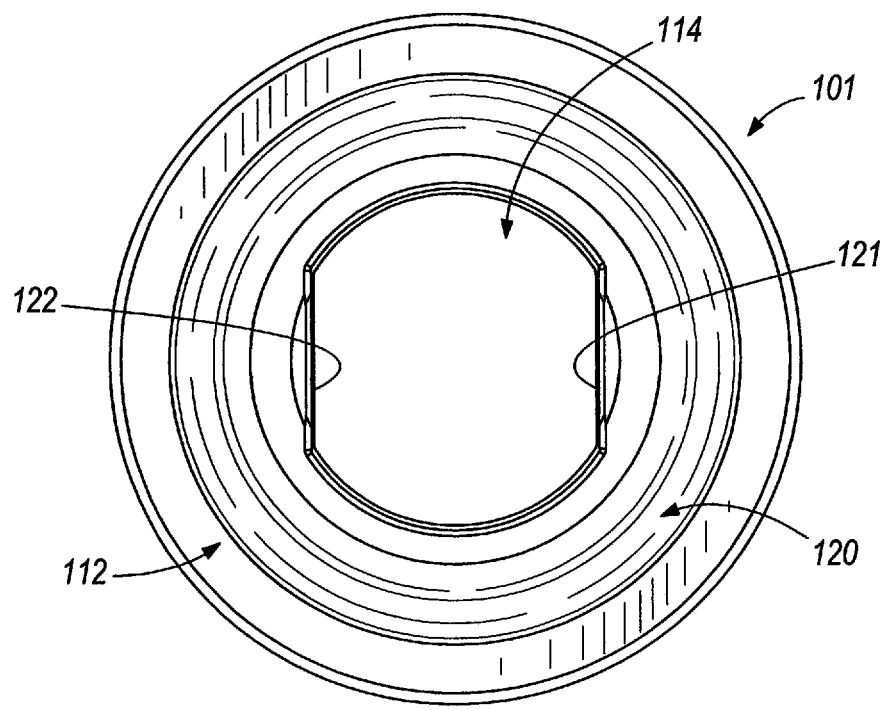
FIGS. 4A, 4B, and 4C are views of a friction member of the power tool arbor system shown in FIG. 1A.
Figure 4B:
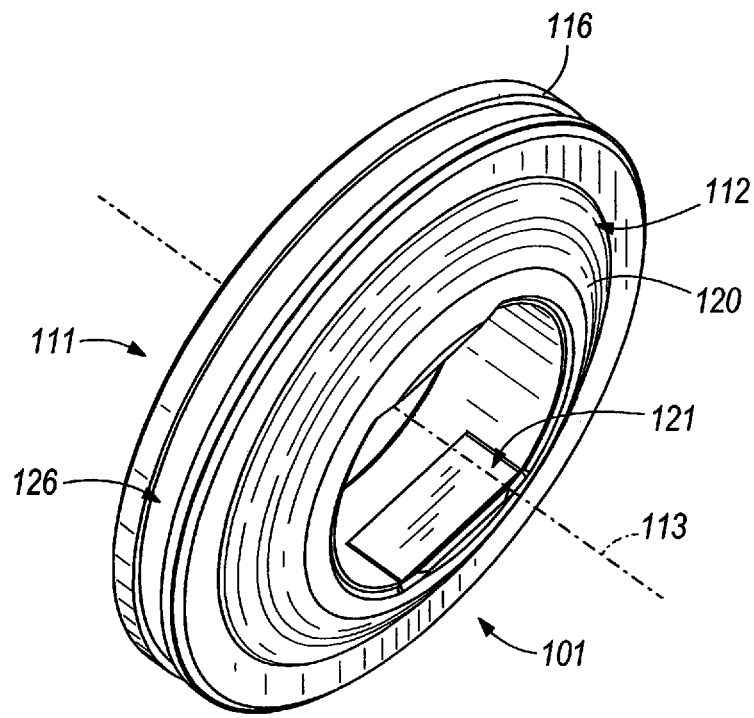
Figure 4C:
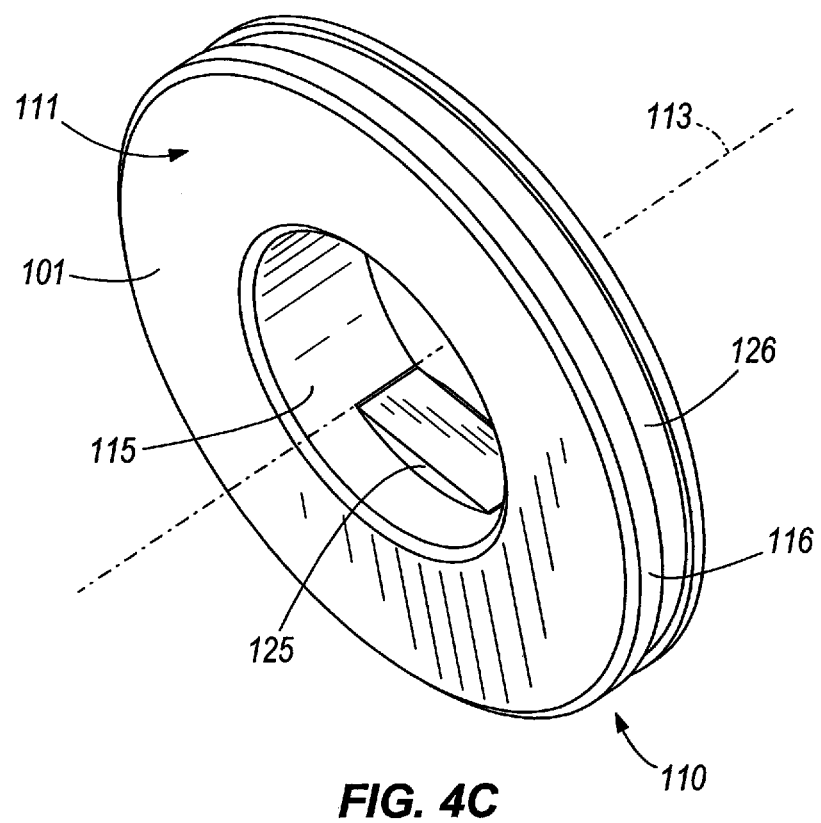

As shown in FIGS. 4A-4C, the friction member 101 has a generally annular form. The friction member 101 includes a mating surface 111, a bearing surface 112, an axis 113 that is aligned with the rotation axis 25 of the assembled arbor system 10, a through hole 114, a counter bore 115, and a peripheral surface 116. The illustrated bearing surface 112 includes a raceway or groove 120. The through hole 114 extends through the friction member 101 between the mating surface 111 and the bearing surface 112, and is a non-cylindrical bore. The hole 114 includes two surfaces 121, 122 for mating with the surfaces 41, 42 of the arbor 16 to prohibit rotation of the friction member 101 about the axis 113 and relative to the arbor 16. The counter bore 115 extends from the mating surface 111 along the axis 113 of the friction member 101 to a counter bore floor 125. The peripheral surface 116 extends between the mating surface 111 and the bearing surface 112 and includes a groove 126 for receiving the sealing element 106, which in the illustrated embodiment is an O-ring.

Figure 5A:
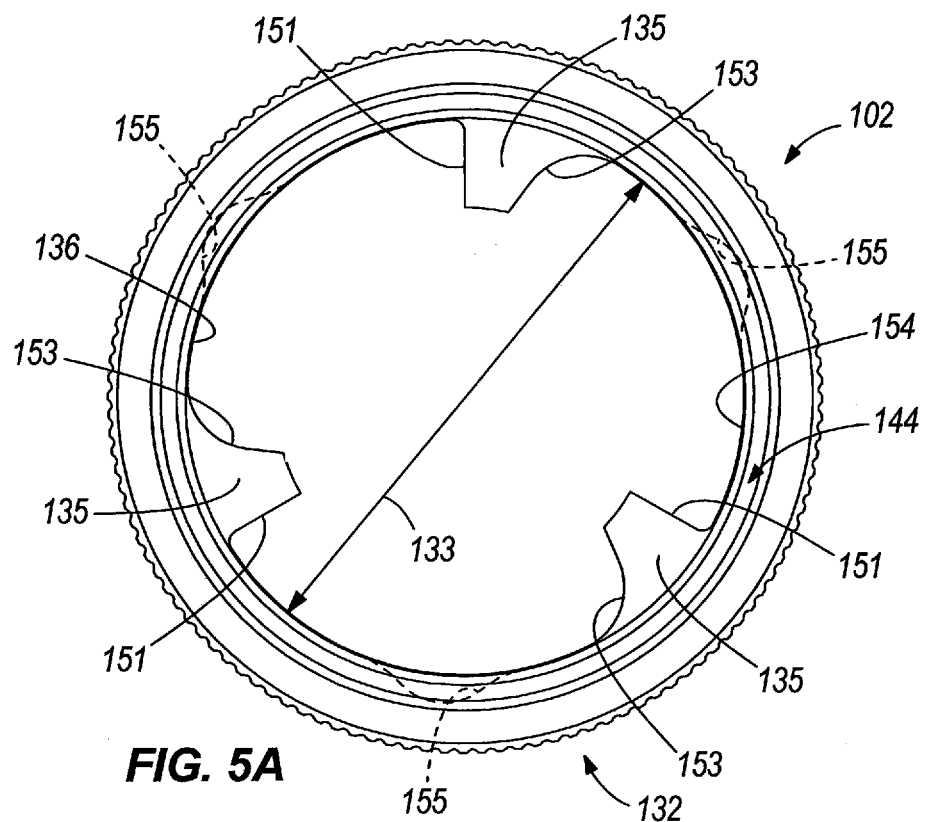
FIGS. 5A, 5B, 5C, and 5D are views of an actuating member of the power tool arbor system shown in FIG. 1A.
Figure 5B:
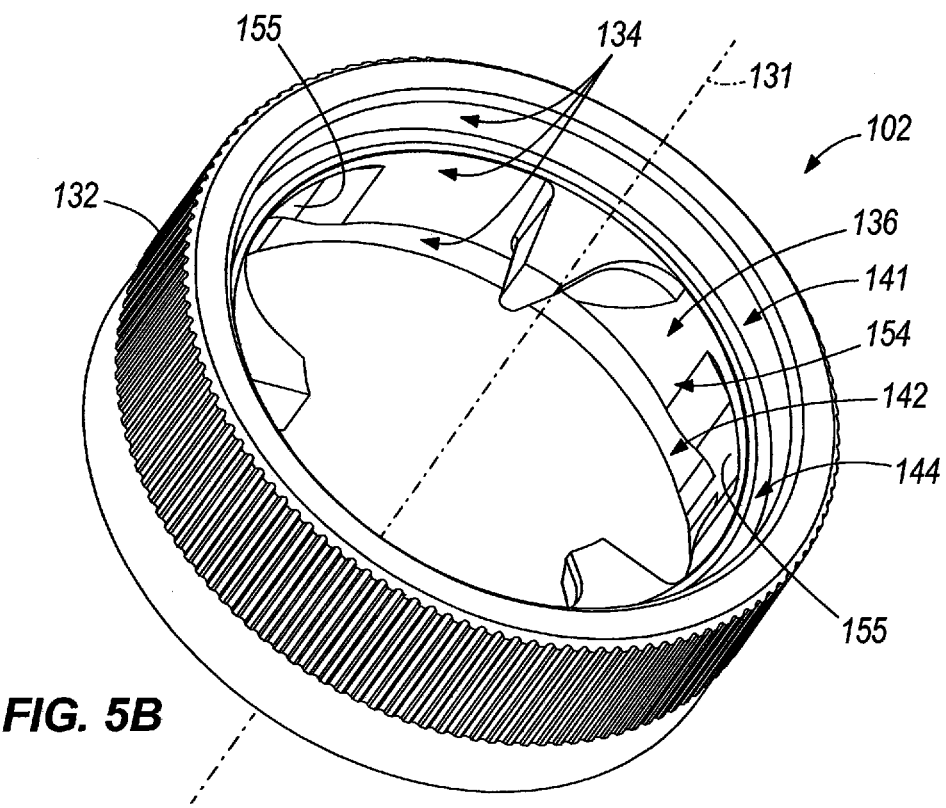
Figure 5C:
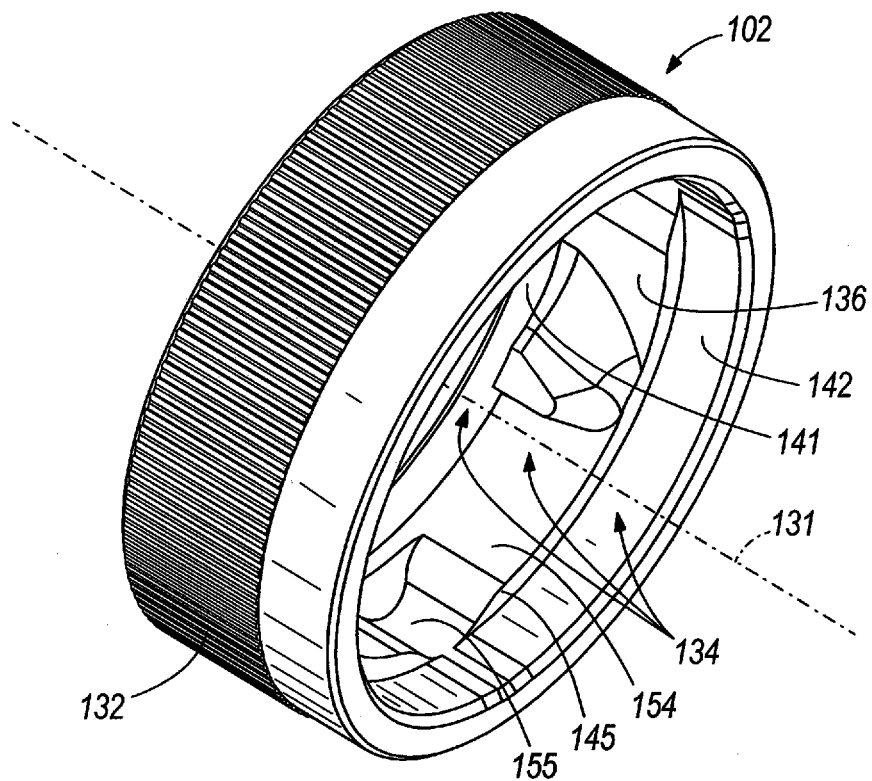

As shown in FIGS. 5A-5C, the actuating member 102 is a ring with a generally cylindrical shape and has a rotation axis 131 that is aligned with the rotation axis 25 of the assembled arbor system 10. The actuating member 102 further includes an outer surface 132, a bore 133 defining an inner surface 134, a ledge 136 extending radially inward from the inner surface 134 to the bore 133, and tangs 135 extending radially inward from the ledge 136. The inner surface 134 of the actuating member 102 includes three portions having different diameters: a first portion 141 at a first end of the actuating member 102, a second portion 142 at a second end of the actuating member 102, and the ledge 136 positioned between the first and second portions 141, 142. A shoulder 144 is positioned between the first portion 141 and the ledge 136, and a shoulder 145 is positioned between the second portion 142 and the ledge 136. As illustrated, the outer surface 132 may be knurled, textured or otherwise coated to facilitate gripping by a user.

Figure 5D:
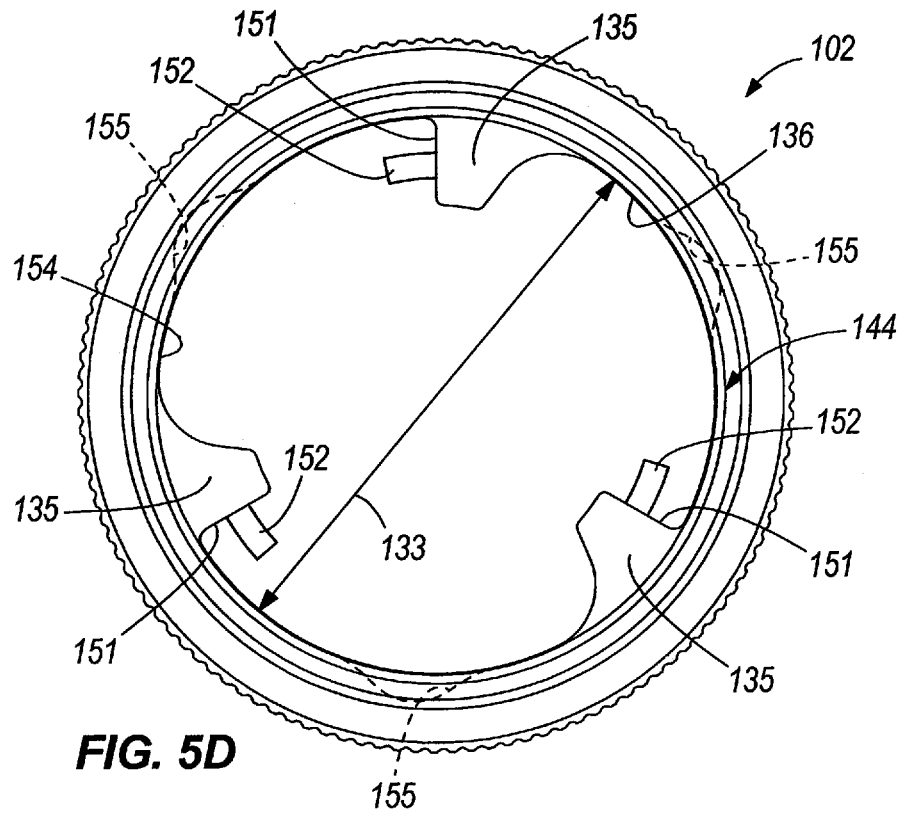

The illustrated embodiment includes three tangs 135 (although fewer or more tangs may be used in other embodiments), and each of the tangs 135 is arranged radially about the central bore 133. Each of the tangs 135 includes a spring surface 151 for engaging one of the spring elements 104 and a roller surface 153, opposite the associated spring surface 151, for engaging one of the roller elements 103. As shown in FIG. 5D, in a further embodiment, each of the spring surfaces 151 may include a protrusion 152 to locate a spring element 104 thereon.

As illustrated, the inner surface 134 of the actuating member 102 includes the ledge 136, which extends between the shoulders 144, 145. The ledge 136 defines a circumferential roller surface 154 about the inner surface 134 of the actuating member 102, whereby the tangs 135 extend radially from the roller surface 154. Between adjacent tangs 135, the roller surface 154 includes a cavity 155 sized and shaped for accepting one of the roller elements 103.

Figure 6:
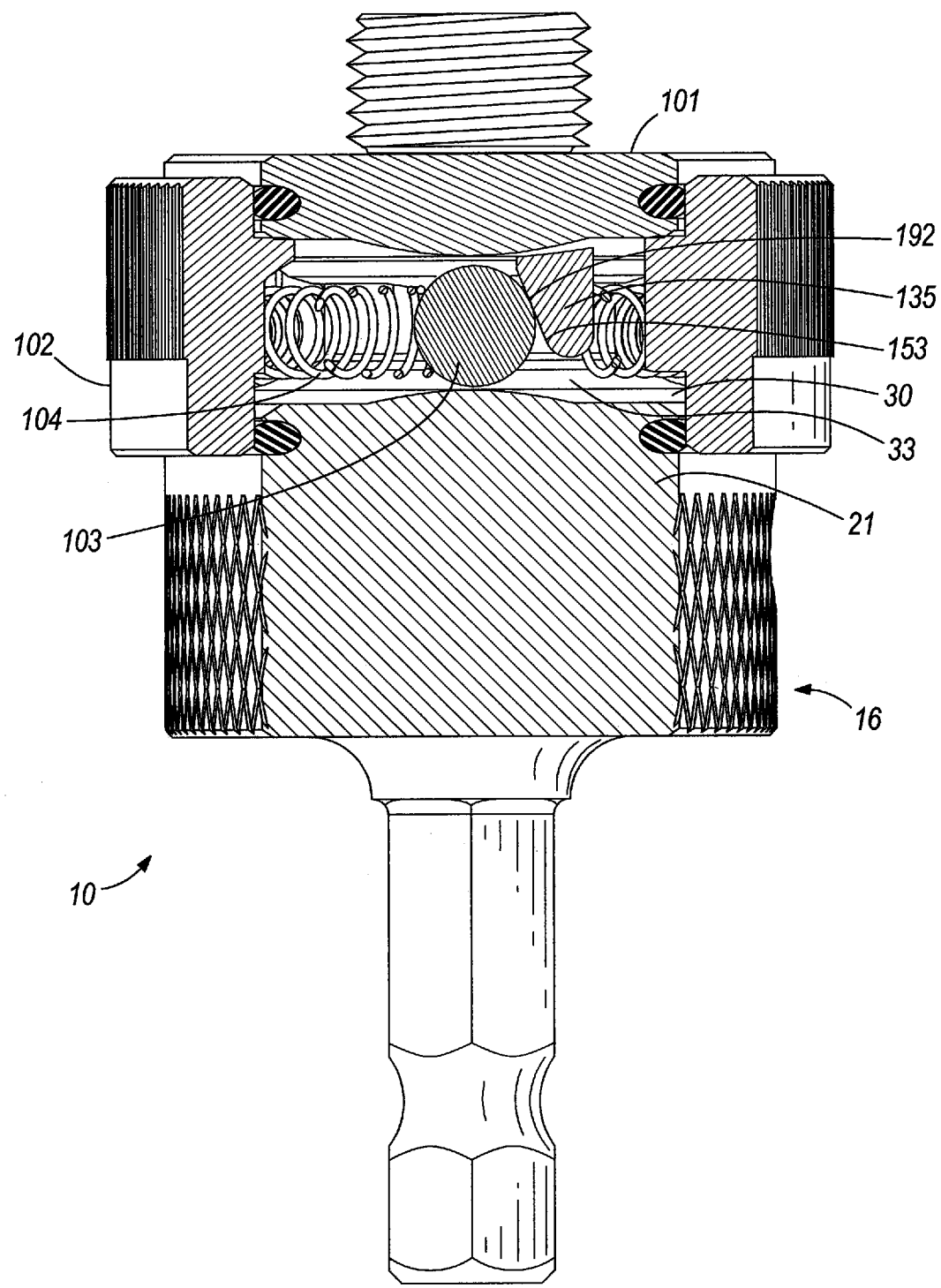
FIG. 6 is a partial cross-section view of the power tool arbor system shown in FIG. 1B in a first position and taken along line 6-6 in FIG. 1B.
Figure 7:
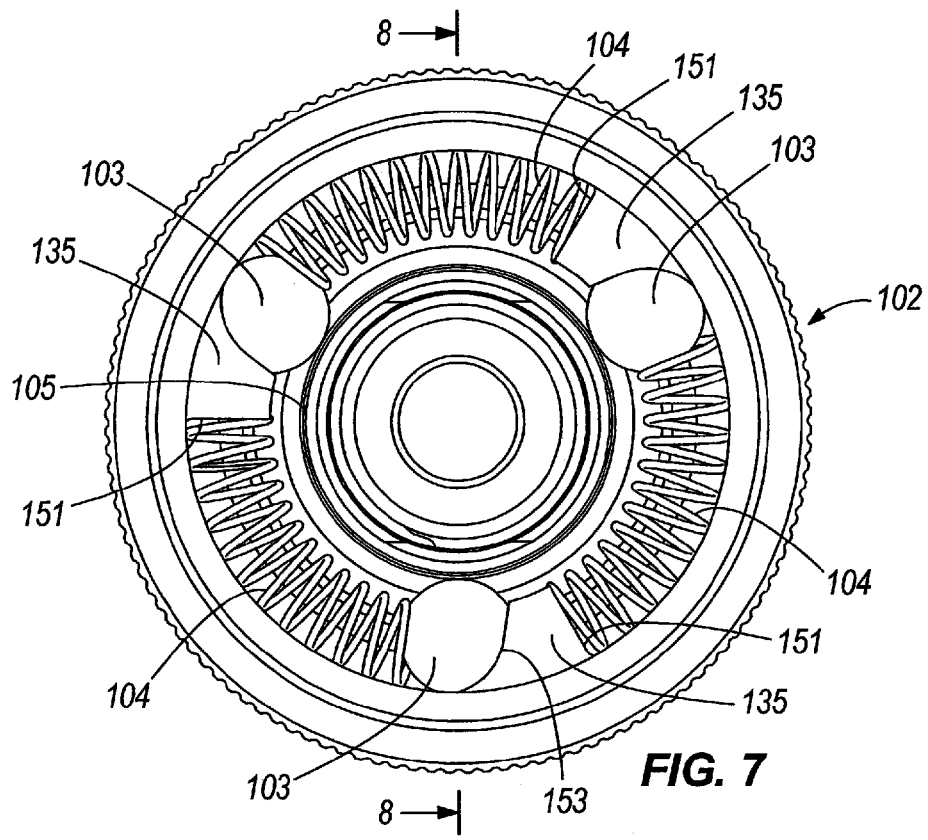
FIG. 7 is an end view of the power tool arbor system of FIG. 6 with the friction member and a retention device removed for clarity.
Figure 8:
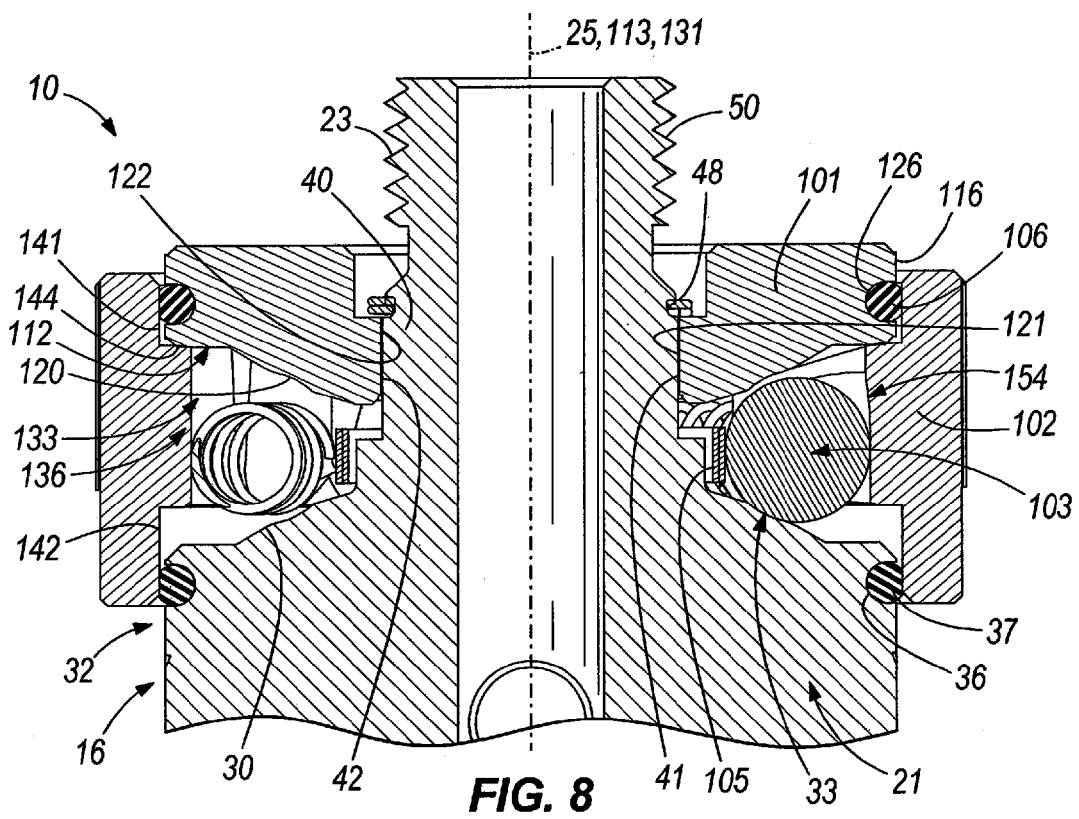
FIG. 8 is a cross-section view of the power tool arbor system of FIG. 6, taken along line 8-8 in FIG. 7.

FIGS. 6-8 illustrate the power tool arbor system 10 in a first position, which is an initial position and normal state of the arbor system 10 without an attached power tool accessory 15. Referring to FIG. 8, the relative positions of the friction member 101, actuating member 102, and arbor 16 are shown. The friction member axis 113 and the actuating member axis 131 are aligned with the rotation axis 25 of the arbor 16. The friction member 101 is located between the actuating member 102 and the end 50 of the arbor 16. The bearing surface 112 of the friction member 101 abuts shoulder 144 of the actuating member 102, such that the raceway 120 of the friction member 101 faces the arbor body 21. The actuating member 102 is positioned around both the friction member 101 and the arbor body 21, such that surface 141 abuts the peripheral surface 116 of the friction member 101, and surface 142 abuts the exterior surface 32 of the body 21. The actuating member 102 is free to rotate relative to the arbor body 102.

Referring to FIG. 2, the release mechanism 17 of the arbor system 10 includes three roller elements 103, which are bearing balls in the illustrated embodiment. In a further embodiment, each of the roller elements 103 may be of another type having a different geometry, different and multiple bearing surfaces, and differing material characteristics. In still further embodiments, fewer or more roller elements 103 may be used. Referring to FIG. 7 the roller elements 103 are positioned around the second projecting end 23 of the arbor 16. With reference to FIG. 8, the roller elements 103 are positioned between the friction member 101 and the arbor body 21 and are seated in the raceway 33 of the bearing surface 30. Each of the roller elements 103 is further positioned between the radially acting spring 105 and the actuating member 102.

The release mechanism 17 of the arbor system 10 includes three spring elements 104, which are coil springs in the illustrated embodiment. In a further embodiment, each of the spring elements 104 may be of another type having a different geometry, different spring constants, and different material characteristics. In still further embodiments, fewer or more spring elements may be used, although there is at least one spring element per roller element. Referring to FIG. 7, the spring elements 104 are positioned around the second projecting end 23 of the arbor 16, and are located between the friction member 101 and the arbor body 21. The spring elements 104 are further located between the radially acting spring 105 and the actuating member 102. Each of the spring elements 104 includes a first end seated on the spring surface 151 of the respective tang 135 and a second end seated on the respective roller element 103.

In the illustrated embodiment, the radially acting spring 105 of the release mechanism 17 is a coiled metal radial spring, although other types of springs may be used. In a further embodiment, the radially acting spring 105 may be comprised of a plurality of radially acting springs 105, in which case each spring may be identical or have different geometries with different spring constants and different material characteristics. The radially acting spring 105 is positioned around the cylindrical portion 40 of the arbor body 21.

In the illustrated embodiment, each of the sealing elements 37, 106 of the arbor system 10 is an O-ring. The sealing elements 37, 106 are located in grooves 36, 126, located respectively on the arbor body 21 and the friction member 101. In further embodiments, the sealing elements 37, 106, may be a gasket or other element adapted to prohibit foreign material from contaminating the release mechanism 17. In the illustrated embodiment, each sealing element 37, 106 seals respectively against first portion 141 and second portion 142 of the inner surface 134 of the actuating member 102. Further, the sealing elements 37, 106 may be located on other components of the power tool arbor system 10, including but not limited to the actuating member 102.

Figure 23:
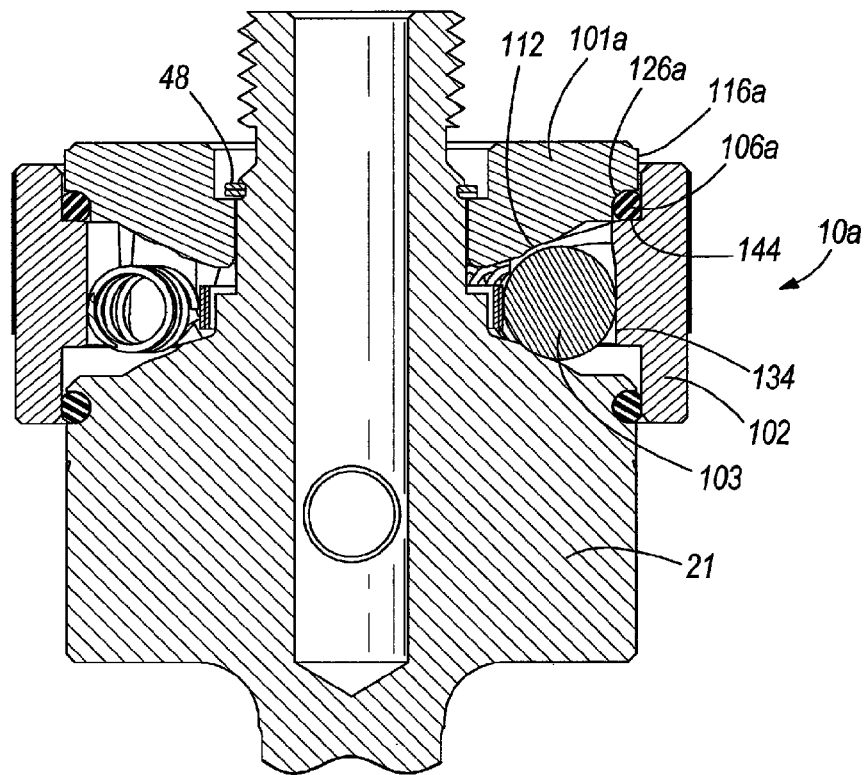
FIGS. 23 and 24 illustrate a power tool arbor system according to another embodiment of the invention.
Figure 24:
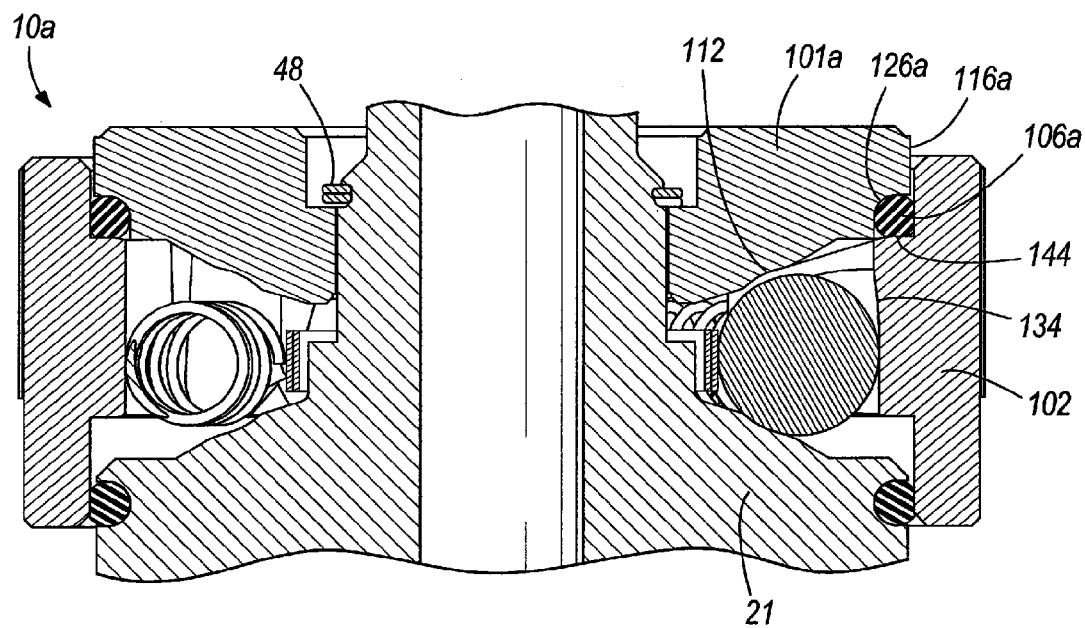

FIGS. 23 and 24 illustrate another embodiment of a power tool arbor system 10a in the first position, which is similar to the arbor system 10 shown and described in FIGS. 1-14. In the arbor system 10a, a friction member 101a includes a groove 126a formed in a peripheral surface 116a. The groove 126a is positioned adjacent the bearing surface 112 of the friction member 101a and receives a sealing element 106a, which is an O-ring in the illustrated embodiment. The sealing element 106a forms a seal between the shoulder 144 on the inner surface 134 of the actuating member 102 and the friction member 101a. The sealing element 106a forms its seal by being axially squeezed between the actuating member 102 and the friction plate 101a. In the arbor system 10a, the friction member 101a is seated upon the sealing element 106a, which is seated on the shoulder 144 of the actuating member 102 and forced against the retention device 48 as a result of the below-mentioned spring forces acting through the actuating member 102. Therefore, the sealing element 106a separates the friction member 101a from the shoulder 144 of the actuating member 102 and there is no contact therebetween.

FIGS. 6-8 illustrate the power tool arbor system 10 in the first position, which is the initial position and normal state of the arbor system 10 without an attached power tool accessory 15. As shown in FIG. 7, each of the spring elements 104 are extended, thereby biasing the respective roller element 103 into engagement with the roller surface 153 of the associated tang 135. As illustrated in FIG. 7, the radially acting spring 105 is contracted and in contact with each of the roller elements 103 to bias the roller elements 103 radially outward and away from arbor body 21. The roller surface 154 (FIG. 8) of the actuating member 102 limits radial movement of the roller elements 103. In the first position of the arbor system 10, the combined spring forces of the spring elements 104 and the radially acting spring 105, force each of the roller elements 103 into a first contact point 192 (FIG. 6) with the roller surface 153 of the respective tang 135. Referring to FIG. 8, the combined spring forces maintain the roller elements 103 in contact with the raceway 33 on the bearing surface 30 of the arbor body 21 and in contact with the roller surface 154 of the actuating member 102.

FIG. 8 also illustrates a position of the friction member 101 with respect to the arbor 16 and the actuating member 102 when the power tool arbor system 10 is in the first position. The friction member 101 is located within the bore 133 of the actuating member 102, and between the first surface portion 141 of the actuating member 102 and the cylindrical portion 40 of the second projecting end 23 of the arbor 16. The first surface 121 of the friction member through hole 114 abuts the first surface 41 of the cylindrical portion 40 and the second surface 122 of the friction member through hole 114 abuts the second surface 42. Engagement of the friction member surfaces 121, 122 with the arbor body surfaces 41, 42, respectively, prevents rotation of the friction member 101 relative to the arbor 16. The friction member 101 is seated upon the shoulder 144 of the actuating member inner surface 134 and forced against the retention device 48 as a result of the aforementioned spring forces acting through the actuating member 102. While the friction member 101 is forced against the retention device 48, the friction member 101 is nonetheless free to move in an axial direction towards the arbor body 21, provided an axial force is applied to friction member 101 that exceeds the aforementioned spring forces. In addition, a gap is formed between the roller elements 103 and the bearing surface 112 of the friction member 101, such that in the first position, the roller elements 103 do not contact the friction member 101 and are not seated in the raceway 120.

Figure 9:
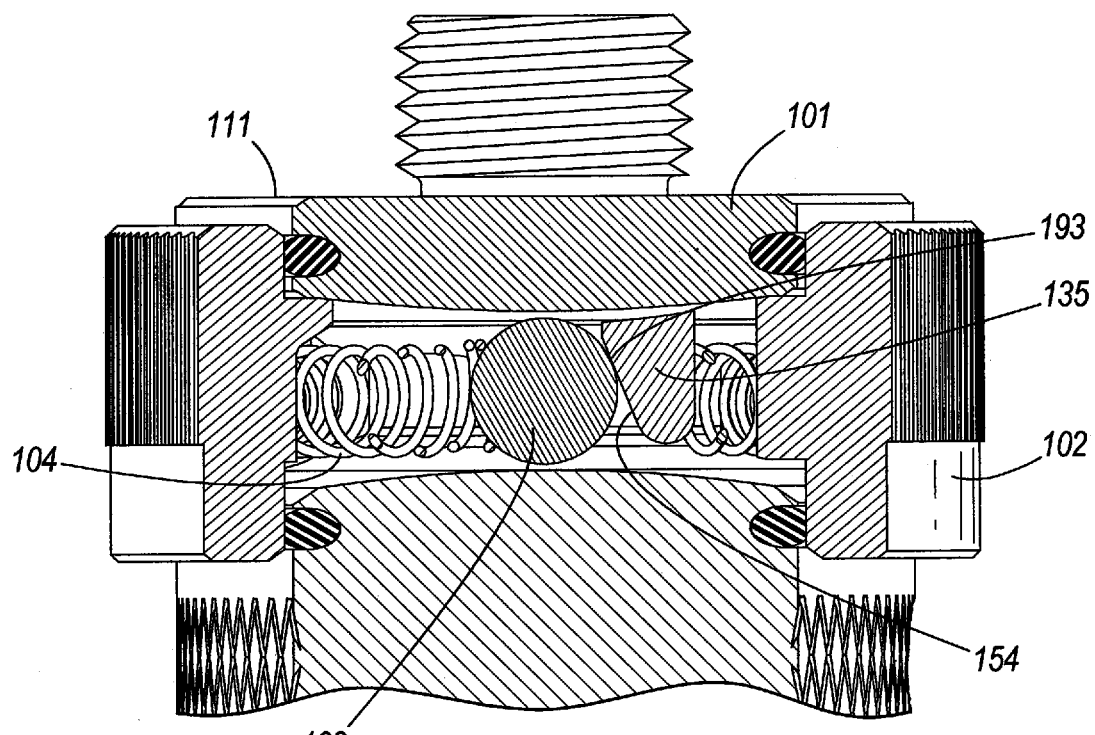
FIG. 9 is a partial cross-section view of the power tool arbor system shown in FIG. 1B in a second position.
Figure 10:
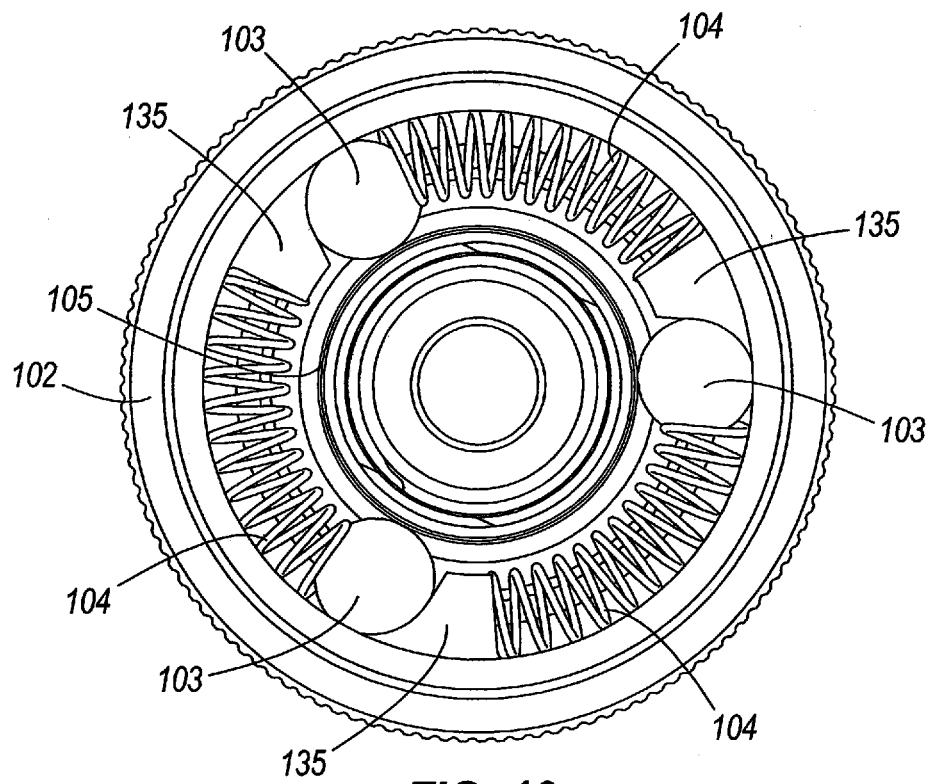
FIG. 10 is an end view of the power tool arbor system of FIG. 9 with the friction member and the retention device removed for clarity.
Figure 11:
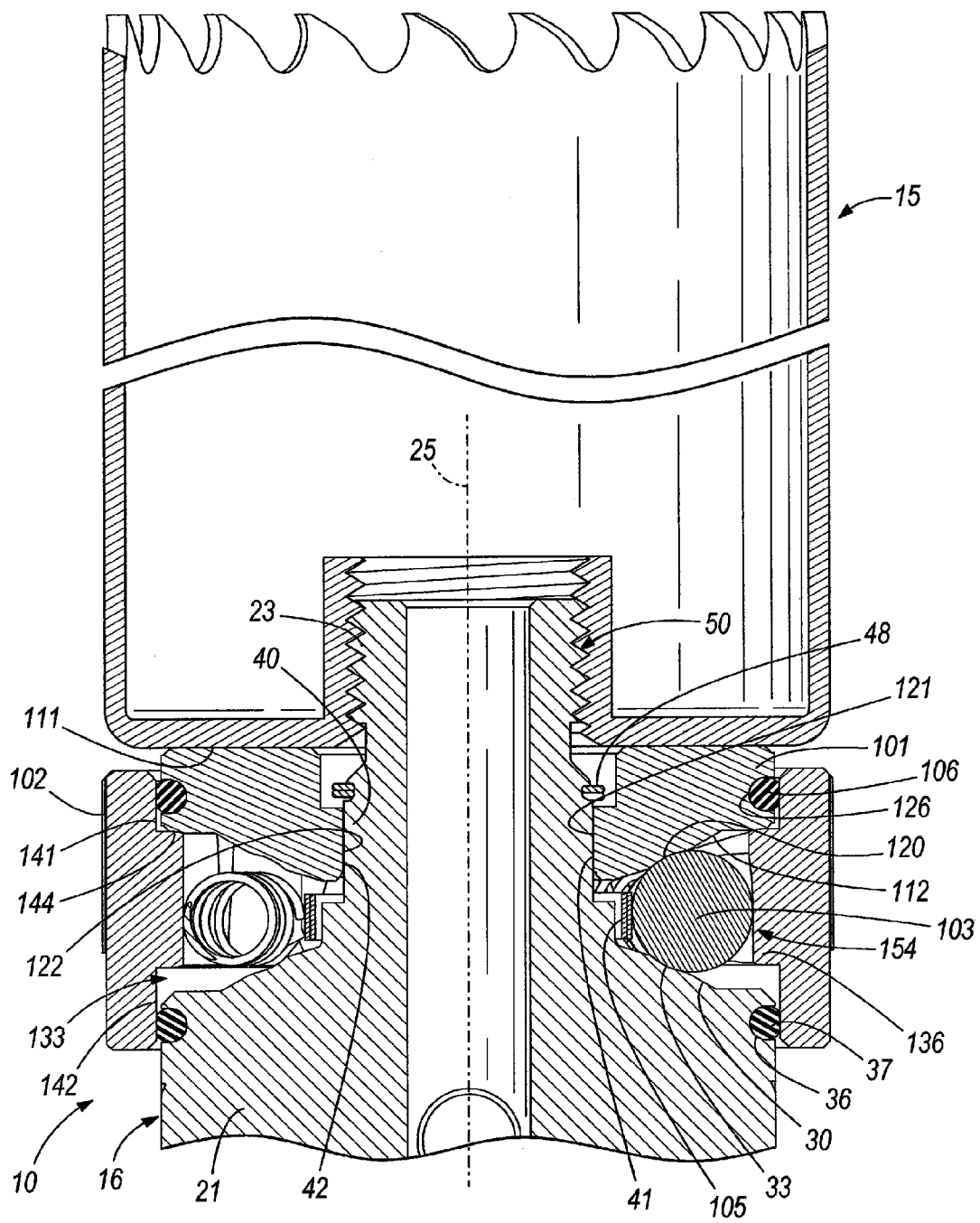
FIG. 11 is a cross-section view of the power tool arbor system of FIG. 9, with an attached hole saw.

FIGS. 9-11 illustrate the power tool arbor system 10 in a second position, which is a position or state of the power tool arbor system 10 with an attached power tool accessory 15 (e.g., a hole saw). The power tool accessory 15 is coupled to the threaded end 50 of the second projecting end 23 of the arbor 16. As the power tool accessory 15 is progressively threaded onto the end 50, the power tool accessory 15 contacts the mating surface 111 of the friction member 101. When the power tool accessory 15 is fully threaded onto the end 50, the friction member 101 is displaced from the first position (FIG. 8) against the retention device 48 and translates along the common rotation axis 25 towards the body 21 of the arbor 16 to the second position. At this position, the raceway 120 of the bearing surface 112 of the friction member 101 contacts the roller elements 103. Continued tightening of the power tool accessory 15 on the end 50, by the user or through operation of the power tool, fixes the power tool accessory 15 to the power tool arbor system 10 and against the mating surface 111 of the friction member 101.

Referring to FIGS. 9 and 11, attachment of the power tool accessory 15 and resultant translation of the friction member 101 also axially translates the actuating member 102 along the arbor 16. Thereby, the point of contact between the roller elements 103 and the roller surface 153 on the respective tang 135 moves from the first contact point 192 (FIG. 6) to a second contact point 193 (FIG. 9) associated with the second position of the power tool arbor system 10. Each of the roller elements 103 moves to the second contact point 193 as the respective spring element 104 moves into a partially compressed position (FIG. 10). The radially acting spring 105 remains contracted and in contact with each of the roller elements 103 to bias the roller elements radially outward and into engagement with the roller surface 154. Referring to FIG. 11, translation of the friction member 101 towards the arbor body 21 and the combined spring forces maintains each of the roller elements 103 in contact with the raceway 33 on the bearing surface 30 of the arbor body 21, the raceway 120 on the bearing surface 112 of the friction member 101, the roller surface 154 on the actuating ring 102, and the radially acting spring 105.

FIG. 11 also illustrates the translated, or second, position of the friction member 101 relative to the retention device 48. In this position, the friction member 101 remains seated upon the shoulder 144 of the inner surface 134 of the actuating member 102 and about the cylindrical portion 40 of the second projecting end 23 of the arbor 16. Further, as the friction member 101 and the actuating member 102 translate axially from the first position to the second position, each sealing element 37, 106, remains in contact respectively with first portion 141 and second portion 142 of the inner surface 134 of the actuating member 102.

Figure 12:
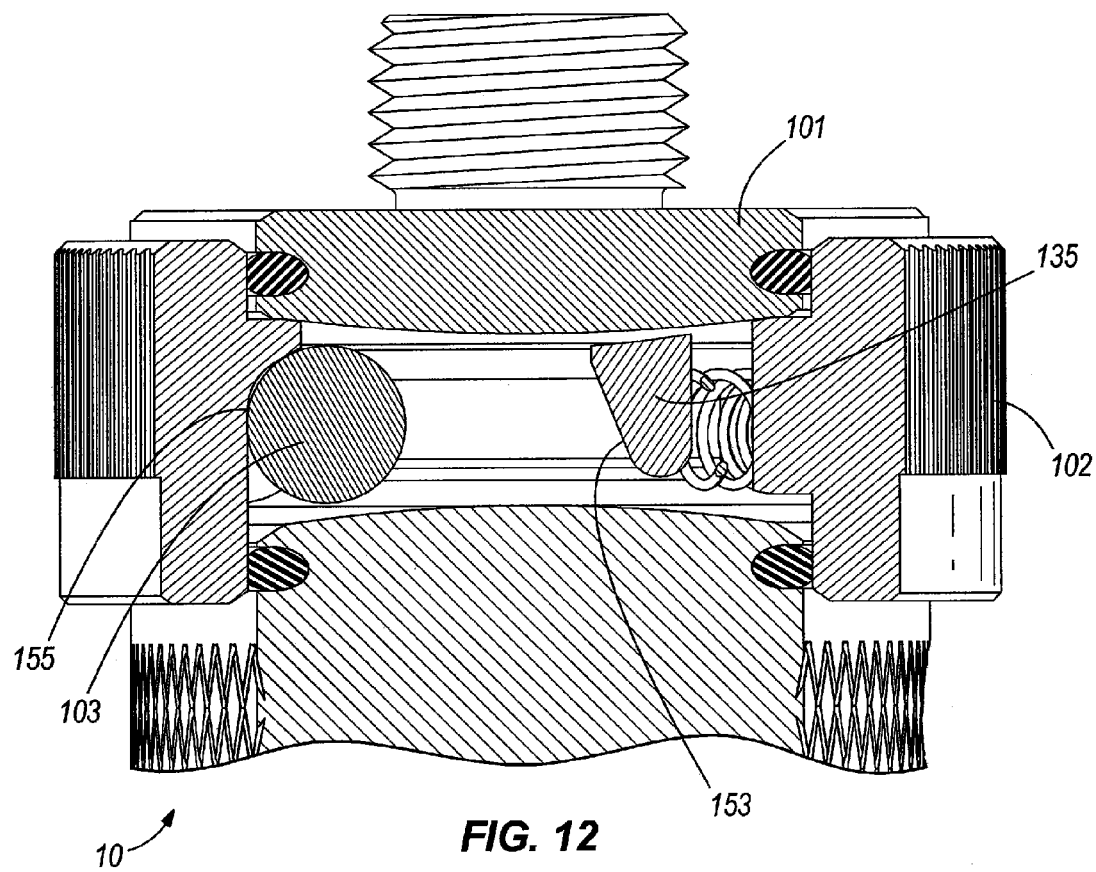
FIG. 12 is a partial cross-section view of the power tool arbor system shown in FIG. 1B in a third position.

FIGS. 12-14 illustrate the power tool arbor system 10 in a third position, which is a position or state of the power tool arbor system 10 to permit release or removal of the attached power tool accessory 15. To release the power tool accessory 15 and permit removal thereof, the actuating ring 102 is rotated in a first direction and held by a user in the third position. While the actuating member 102 is initially rotated by the user, the roller elements 103 are held stationary between the raceway 120 located on the bearing surface 112 of the friction member 101 and the raceway 33 on the bearing surface 31 of the arbor body 21. Once the actuating member 102 is rotated such that each of the cavities 155 located on the roller surface 154 of the ledge 136 are radially aligned with the respective roller element 103, the outward radial force of the radially acting spring 105 forces the roller element 103 into the aligned cavity 155.

Referring to FIG. 13, each of the roller elements 103 slides further down the bearing surface 31 towards the actuating member 102 to sit in the respective cavity 155. The roller elements 103 move axially away from the raceway 120 on the bearing surface 112 of the friction member 101 and are no longer in contact with the friction member 101. Thereby, the friction member 101 is free to axially translate along the arbor 16 and moves away from the attached power tool accessory 15. A gap is formed between the mating surface 111 of the friction member 101 and the power tool accessory 15, and no axial force is exerted by the release mechanism 17 upon the power tool accessory 15. Therefore, any pressure that exists between the power tool accessory 15 and the arbor 16 is relieved to allow a user to loosen and remove the power tool accessory 15 from the arbor 16.

FIG. 13 illustrates the friction member 101 in the third position, restricted from further axial translation toward the arbor body 21. In the third position, the bearing surface 112 of friction member 101 contacts the shoulders 43, 44 of the projecting end 23 of the arbor 16. In this position, the friction member 101 remains seated upon the shoulder 144 on the inner surface 134 of the actuating member 102 and around the cylindrical portion 40 of the arbor 16. Further, as the friction member 101 and the actuating member 102 translate axially from the second position to the third position, the sealing elements 37, 106 remain in contact respectively with the first portion 141 and the second portion 142 of the inner surface 134 of the actuating member 102.

Rotation of the actuating member 102 and the resultant seating of each of the roller elements 103 into the respective cavity 155 permits further axial translation of the actuating member 102. Referring to FIG. 14, rotation of the actuating member 102 also forces each of the spring elements 104 into a compressed position, and the radially acting spring 105 expands and contacts the roller elements 103. Referring to FIG. 13, as a result of the combined spring forces of the spring elements 104 and the radially acting spring 105, each of the roller elements 103 no longer contacts the roller surface 153 of the respective tang 135. This condition is further illustrated in FIGS. 12, and 14, where the expanded radially acting spring 105 forces each of the roller elements 103 into the respective cavity 155.

Once the roller elements 103 are seated in the respective cavity 155, the friction member 101 and actuating member 102 axially translate along the arbor 16 towards the arbor body 21 to release the mating surface 111 of the friction member 101 from the power tool accessory 15 and form a gap therebetween. Once the friction member 101 axially moves toward the arbor body 21, the spring elements 104 (because there is no more friction on the roller elements 103 from the power tool accessory 15) bias each of the roller elements 103 out of the respective cavity 155 and back towards the respective tang 135. The roller elements 103 will be maintained in an intermediate position (not shown) between the second and third positions. The friction member 101 then moves axially away from the arbor body 21 such that the mating surface 111 again contacts the power tool accessory 15; however, only the force of the spring elements 104 create pressure therebetween.

Once a user removes the power tool accessory 15 and releases the actuating member 102, the power tool arbor system 10 returns to the first position illustrated in FIGS. 6-8, which is the state of the power tool arbor system 10 without an attached power tool accessory 15. When the actuating member 102 is released, the spring biases of the release mechanism 17 are restored and each of the spring elements 104 is permitted to move from a compressed state to an extended state. As the spring elements 104 extend and the actuating member 102 rotates, each of the roller elements 103 is pushed out of the respective cavity 155 and up the bearing surface 30 of the arbor body 21 until the first contact point 192 of the roller elements 103 engages the roller surface 153 of the respective tang 135. The radially acting spring 105 returns to a compressed state. The restored spring biases in turn cause the actuating member 102 to rotate in a second direction and to translate axially away from the arbor body 21, as shown in FIGS. 6 and 8. The friction member 101 translates axially with the actuating member 102 until the friction member 101 is once again in the first position relative to the retention device 48.

Figure 15:
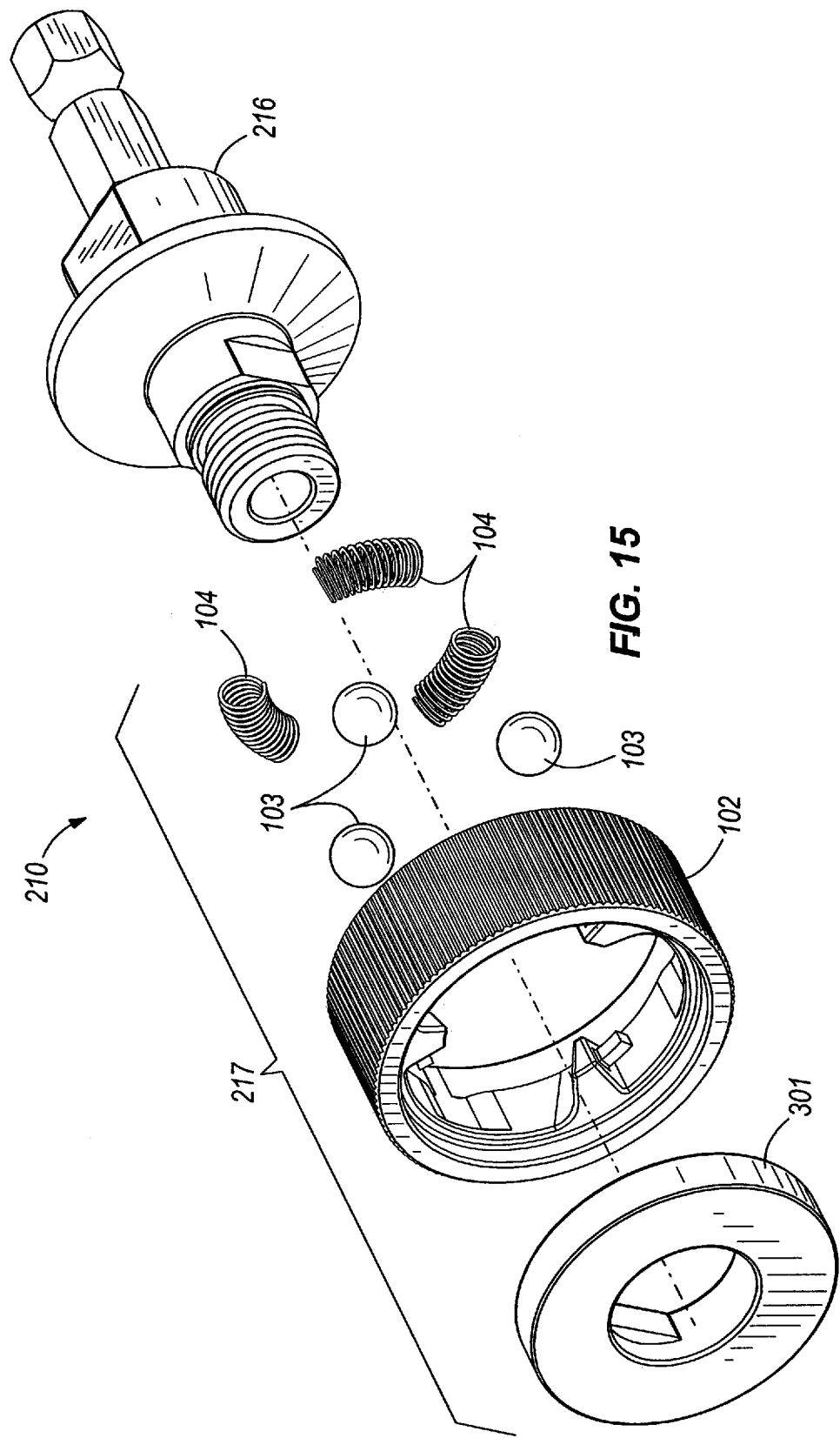
FIG. 15 is an exploded view of a power tool arbor system according to another embodiment of the invention.

FIG. 15 illustrates a power tool arbor system 210 according to another embodiment of the invention. The arbor system 210 is similar to the arbor system 10 illustrated in FIGS. 1-14 and operates in a substantially similar manner; therefore, like structure will accordingly be labeled with like reference numerals. Discussion of the arbor system 210 will be limited to the features that differ from those of the arbor system 10 discussed above.

Figure 16:
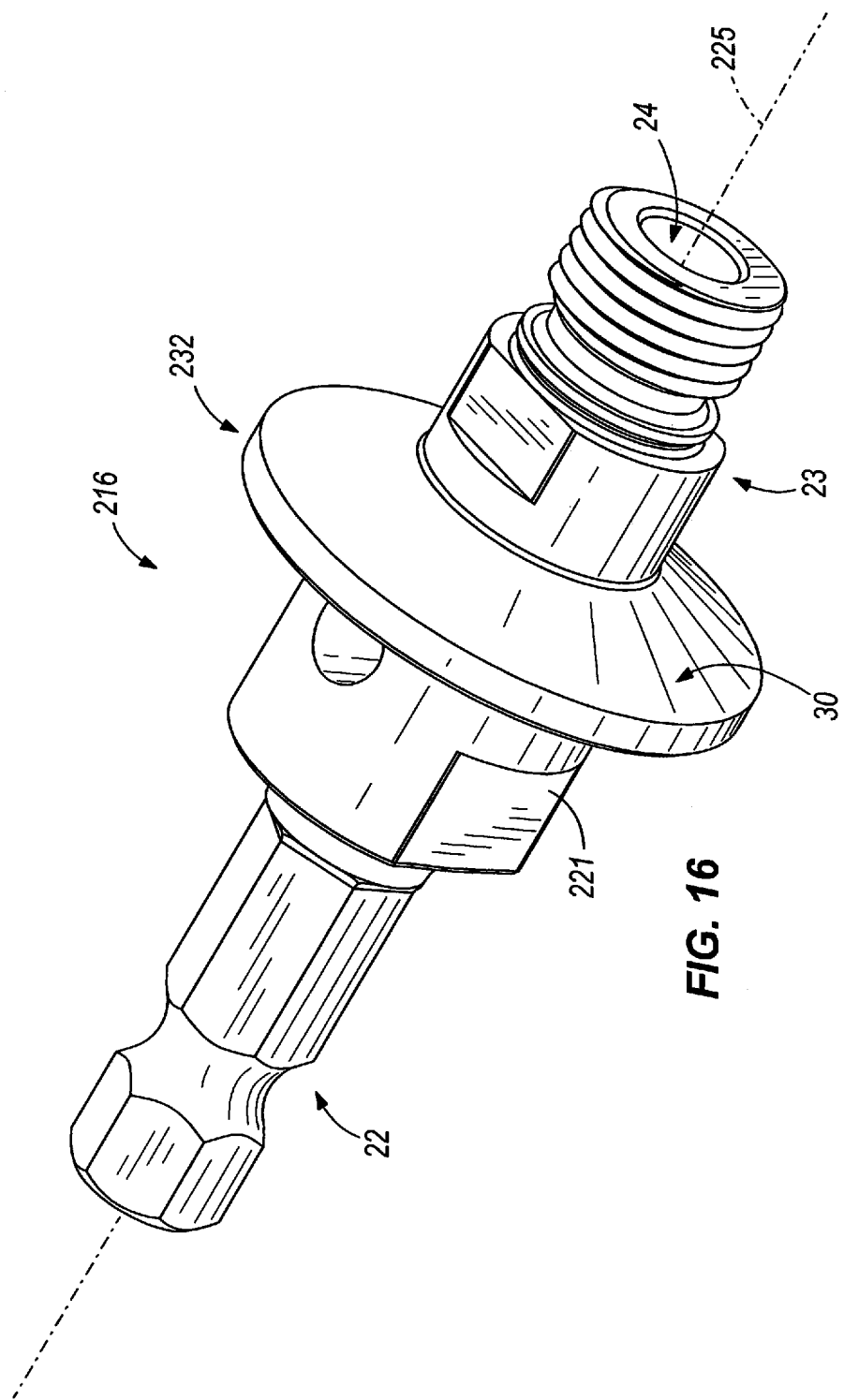
FIG. 16 is a perspective view of an arbor of the power tool arbor system shown in FIG. 15.

The power tool arbor system 210 shown in FIG. 15, includes an arbor 216 and a release mechanism 217 to facilitate removal of the power tool accessory 15 (shown in FIG. 1A) from the arbor 216 after use. Referring to FIG. 16, the arbor 216 includes a body 221, the first projecting end 22, the second projecting end 23, and the bore 24, which all share a common rotation axis 225. In the illustrated embodiment, the body 221 does not include a raceway formed on the bearing surface 30, such as the raceway 33 of the arbor system 10. In the illustrated embodiment, the body 221 includes an exterior surface 232, however the exterior surface 232 does not include a groove, such as the groove 36 formed in exterior surface 32 of the arbor system 10. In a further embodiment, the body 221 may include these features.

Referring to FIG. 15, the release mechanism 217 of the arbor system 210 includes a friction member 301, the actuating member 102, roller elements 103, spring elements 104, and a radially acting spring (not shown, but similar to the radially acting spring 105 shown in FIG. 2). The release mechanism 217 is located on the arbor 216 and retained axially with a retention device (not shown, but similar to the retention device 48 shown in FIG. 2). In the illustrated embodiment, the release mechanism 217 does not include sealing elements between the friction member 301 or arbor body 221 and the actuating member 102, such as sealing elements 37, 106 shown in FIG. 2; although, in a further embodiment, the release mechanism 217 may include sealing elements.

Figure 17A:
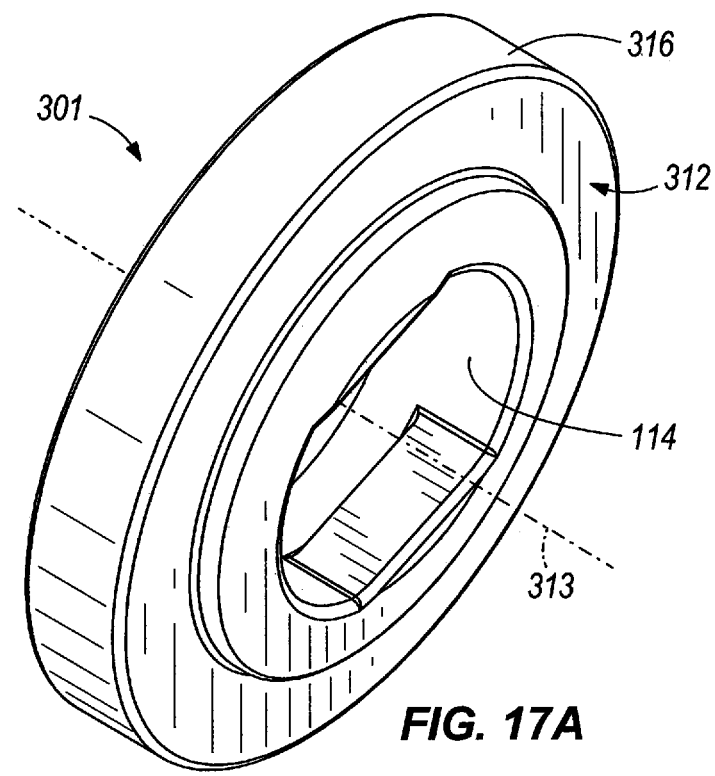
FIGS. 17A and 17B are views of a friction member of the power tool arbor system shown in FIG. 15.
Figure 17B:
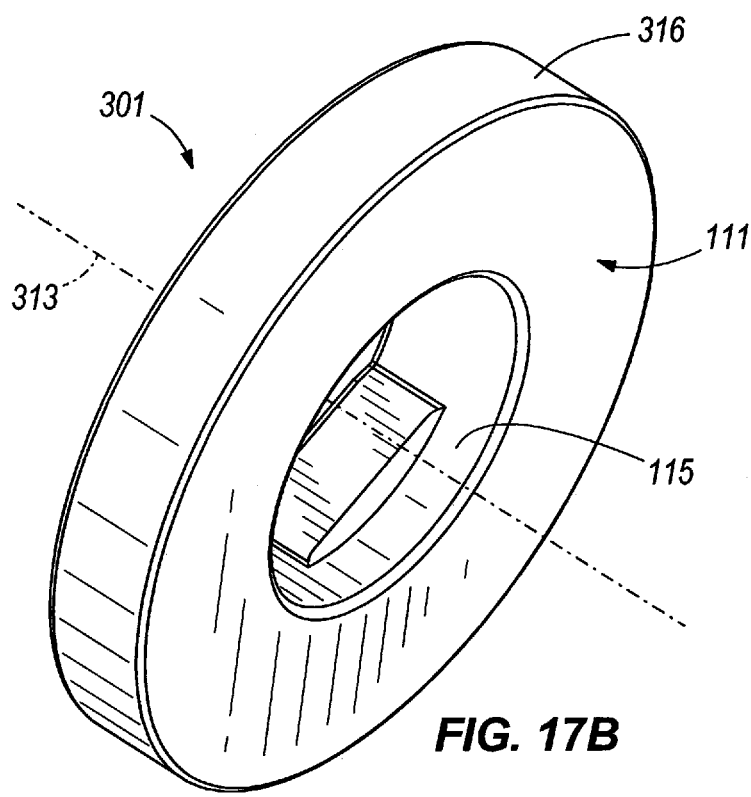

FIGS. 17A and 17B illustrate the friction member 301 of the arbor system 210, which has a generally annular form. The friction member 301 includes the mating surface 111, a bearing surface 312, an axis 313, the through hole 114, the counter bore 115, and a peripheral surface 316. In the illustrated embodiment, the bearing surface 312 does not include a raceway, such as the raceway 120 of the arbor system 10. The outer peripheral surface 316 of the friction member 301 does not include a peripheral groove, such as the peripheral groove 126 of the arbor system 10. However, in a further embodiment, the friction member may include these features.

In all other respects, the release mechanism 217 of the arbor system 210 is substantially similar to the release mechanism 17 discussed above with respect to the arbor system 10. Accordingly, operation of the power tool arbor 210 is substantially similar to the described operation of the power tool arbor 10.

FIG. 18 illustrates a power tool arbor system 410 according to another embodiment of the invention. The arbor system 410 is similar to the arbor system 10 illustrated in FIGS. 1-14 and operates in a substantially similar manner; therefore, like structure will accordingly be labeled with like reference numerals. Discussion of the arbor system 410 will be limited to the features that differ from those of the arbor system 10 discussed above.

Figure 19:
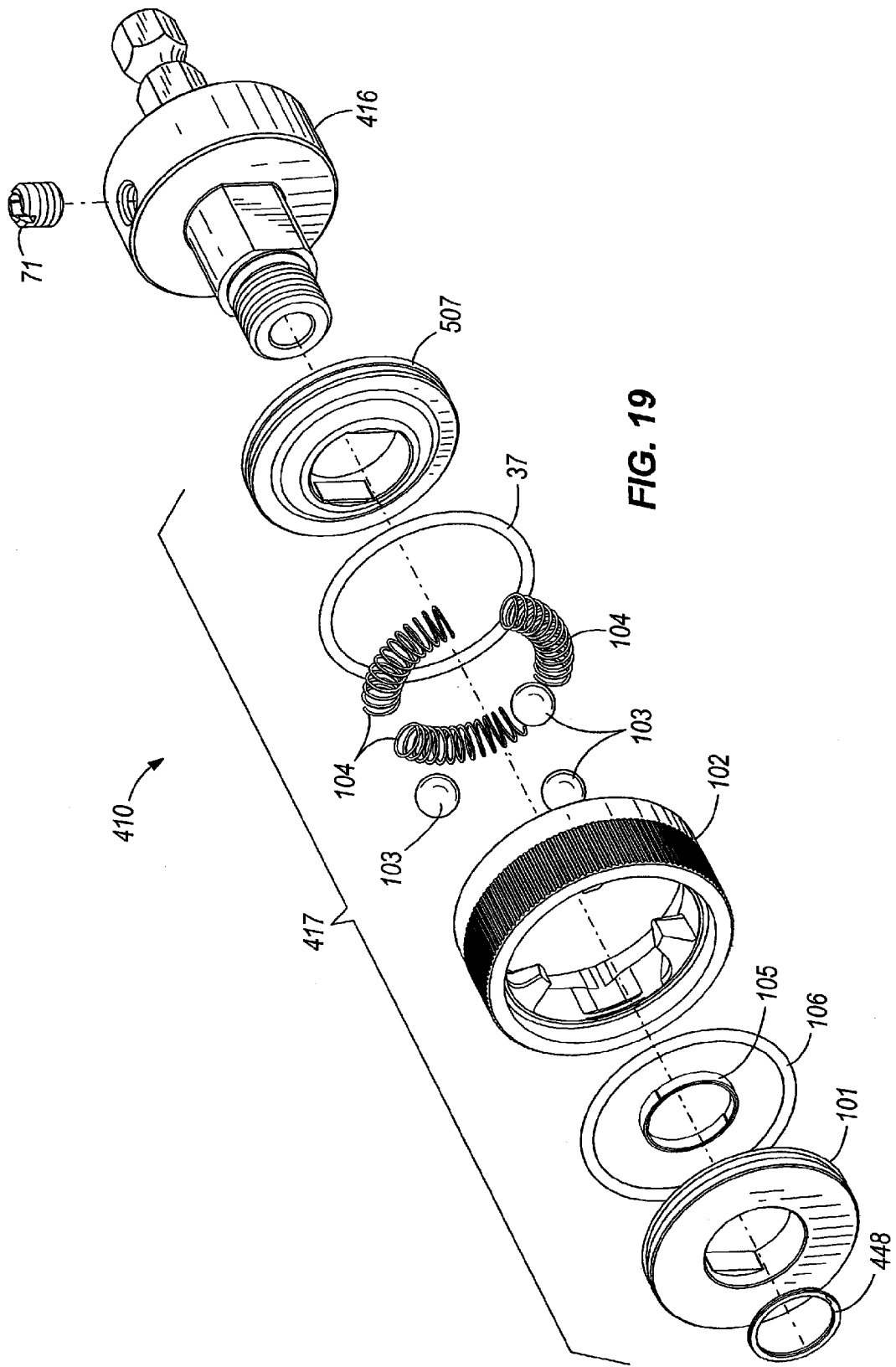
FIG. 19 is an exploded view of the power tool arbor system shown in FIG. 18.
Figure 20:
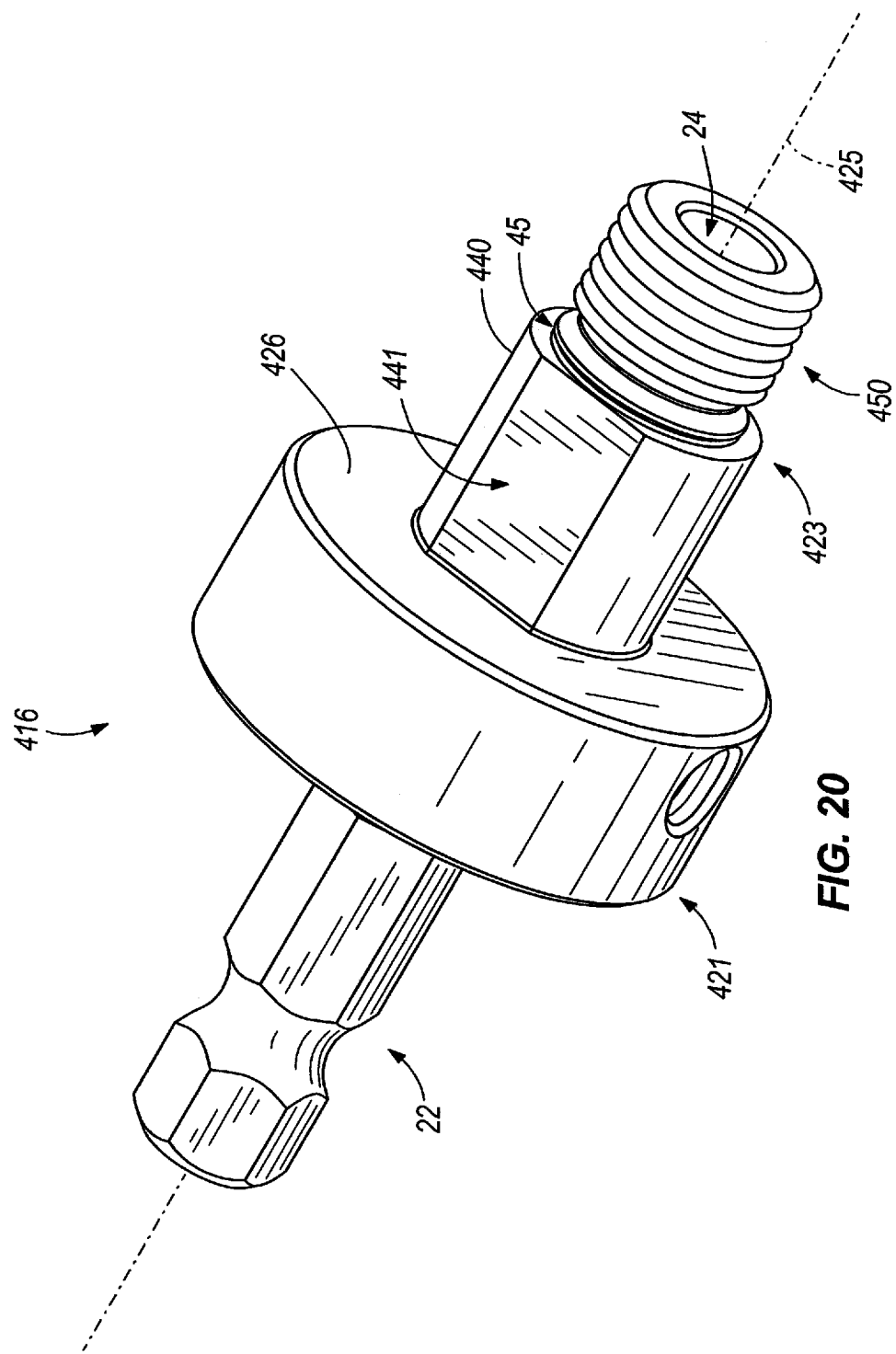
FIG. 20 is a perspective view of an arbor of the power tool arbor system shown in FIG. 18.
Figure 21A:
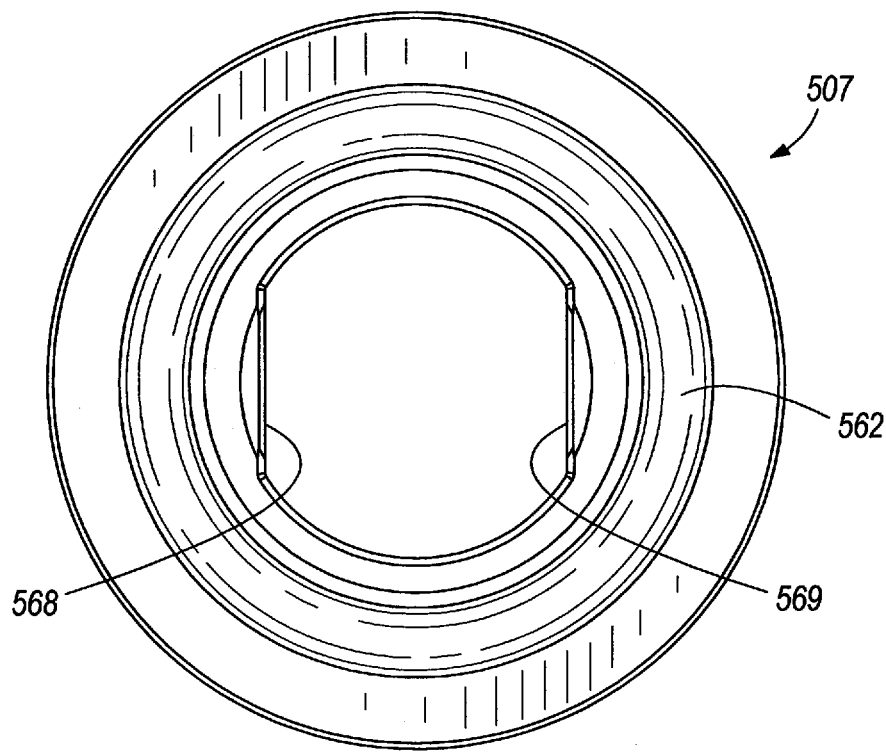
FIGS. 21A, 21B, 21C are views of a bearing member of the power tool arbor system shown in FIG. 18.
Figure 21B:
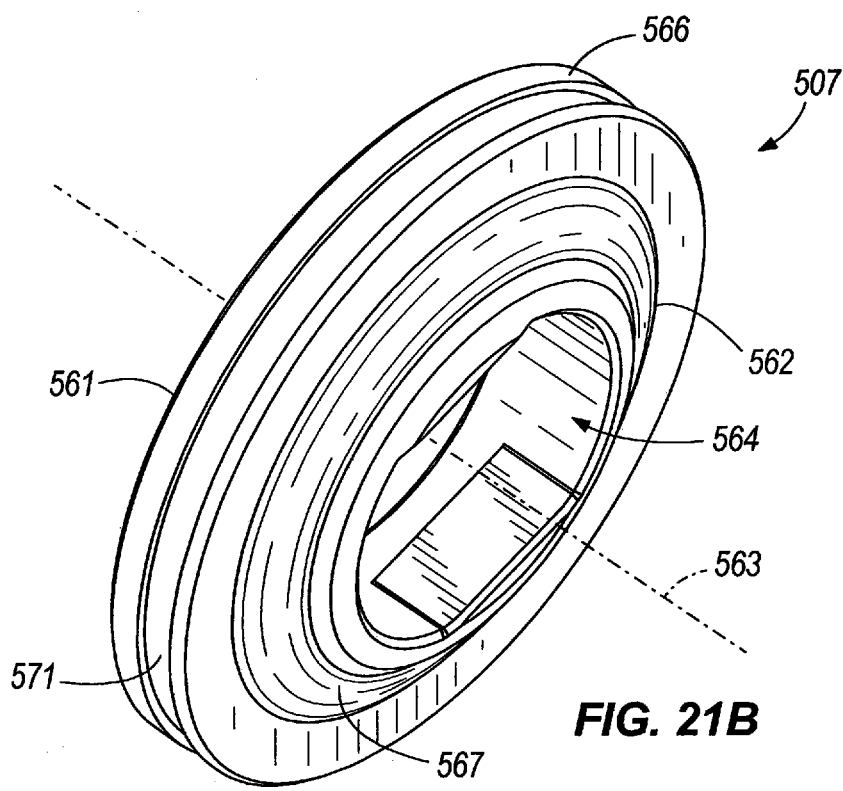

Referring to FIG. 19, the power tool arbor system 410 includes an arbor 416 and a release mechanism 417 to facilitate removal of the power tool accessory 15 (shown in FIG. 18) from the arbor 416 after use. Referring to FIG. 20, the arbor 416 includes a body 421, the first projecting end 22, a second projecting end 423, and the bore 24, which all share a common rotation axis 425. In the illustrated embodiment, the body 421 does not include a raceway formed on the bearing surface 30, such as the raceway 33 of the arbor system 10. Rather, the body 421 includes a planar support surface 426. Further, the body 421 does not include a groove, such as the groove 36 formed in the exterior surface 32 of the arbor system 10. In a further embodiment, the body 421 may include these features.

The second projecting end 423 of the power tool arbor system 410 extends from the body 421 and includes a generally cylindrical portion 440. The cylindrical portion includes a pair of flat surfaces 441 (only one of which is shown in FIG. 20) to prohibit the rotation of the arbor 416 relative to a mating part (e.g., the friction member 101 and a bearing member 507 discussed below). The surfaces 441 of the cylindrical portion 440 intersect the support surface 426 of the body 421, although in a further embodiment, the surfaces may have a shorter axial length and define a shoulder between the surface 441 and the cylindrical portion 440. The projecting end 423 includes a groove 45 for receiving a retention device 448 (FIG. 22), such as a retaining ring, that retains the friction member 101 on the arbor 416. The threaded end 50 extends from the groove 45 to couple the power tool accessory 15 (FIGS. 18 and 22) to the arbor 416.

Figure 22:
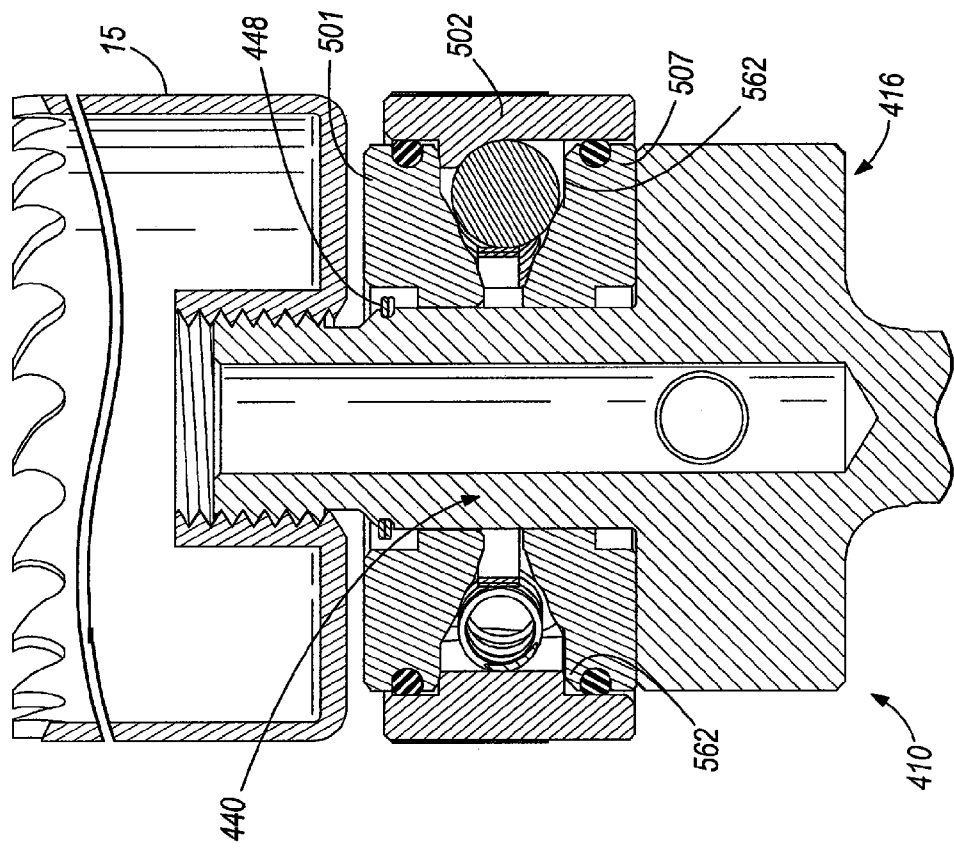
FIG. 22 is a cross-section view of the power tool arbor system of FIG. 18 in a third position taken along line 22-22 in FIG. 18.
Figure 21C:
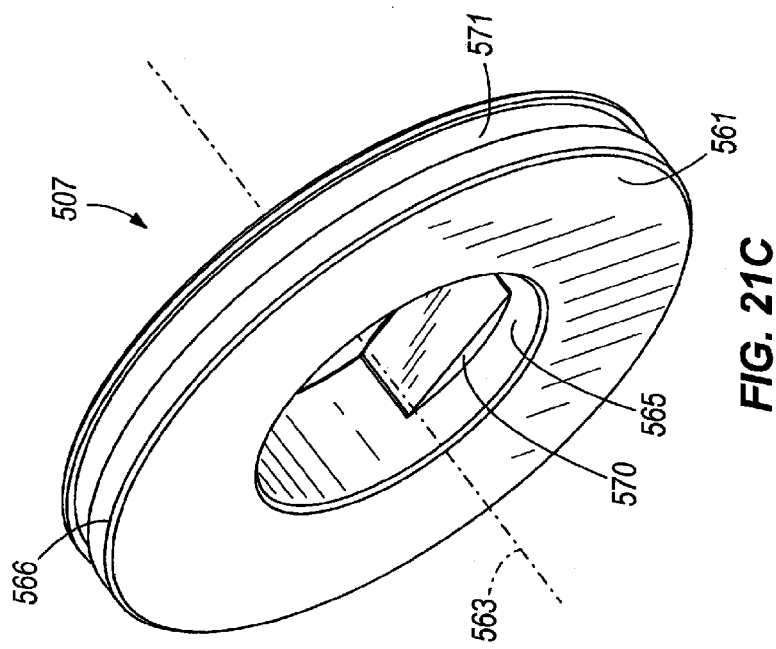

Referring to FIG. 19, the release mechanism 417 includes the friction member 101, the actuating member 102, roller elements 103, spring elements 104, the radially acting spring 105, and the sealing element 106. The release mechanism 417 further includes a bearing member 507. The bearing member 507 replaces bearing surface 30 of the arbor body 21 of arbor system 10. As discussed below, the bearing member 507 includes features of the arbor body 21, which are not present in the arbor body 421. The release mechanism 417 is located on the arbor 416 and retained axially by the retention device 448 (FIG. 22).

Referring to FIGS. 19 and 21A-21C, the bearing member 507, as illustrated, is identical to the friction member 101 as described above with respect to the arbor system 10. In further embodiments, the bearing member 507 may have different structure. The bearing member 507 has an overall annular form. The bearing member 507 includes a mating surface 561, a bearing surface 562, an axis 563, a through hole 564, a counter bore 565, and a peripheral surface 566. The bearing surface 562, as illustrated in this embodiment, includes a raceway 567. The peripheral surface 566 extends between the mating surface 561 and the bearing surface 562 and includes a groove 571 adapted to receive the sealing member 37. The through hole 564 includes two surfaces 568, 569, for mating with the surfaces 441 of the arbor 416 to prohibit rotation of the bearing member 507 about axis 563 and relative to the arbor 416. The bearing member 507 is positioned opposite to the friction member 101, with axis 563 aligned with axis 525 of the arbor. The mating surface 561 abuts support surface 426 of the arbor body 421.

In all other respects, the release mechanism 417 of the arbor system 410 is substantially similar to the release mechanism 17 discussed above with respect to the arbor system 10. Accordingly, operation of the power tool arbor 410 is substantially similar to the described operation of the power tool arbor 10.

One difference in operation of the release mechanism 417 of the power tool arbor system 410 with respect to the release mechanism 17 of the arbor system 10 occurs in the third position, that is, when the state of the power tool arbor system 417 is adjusted to permit release of the power tool accessory 15. FIG. 22 illustrates the power tool arbor system 410 and the friction member 101 in the third position. The friction member 101 is restricted from further axial translation toward the arbor 416 because the actuating member 502 is also prohibited from further axial translation. In the third position, the actuating member 502 contacts the bearing surface 562 of the bearing member 507. Although the individual components of the arbor system 410 engage one another in a slightly different manner in the third position, the resultant movement of the friction member 101 away from the attached power tool accessory 415 is the same. Thereby, the power tool accessory 415 may be removed in the manner described above.

Figure 25:
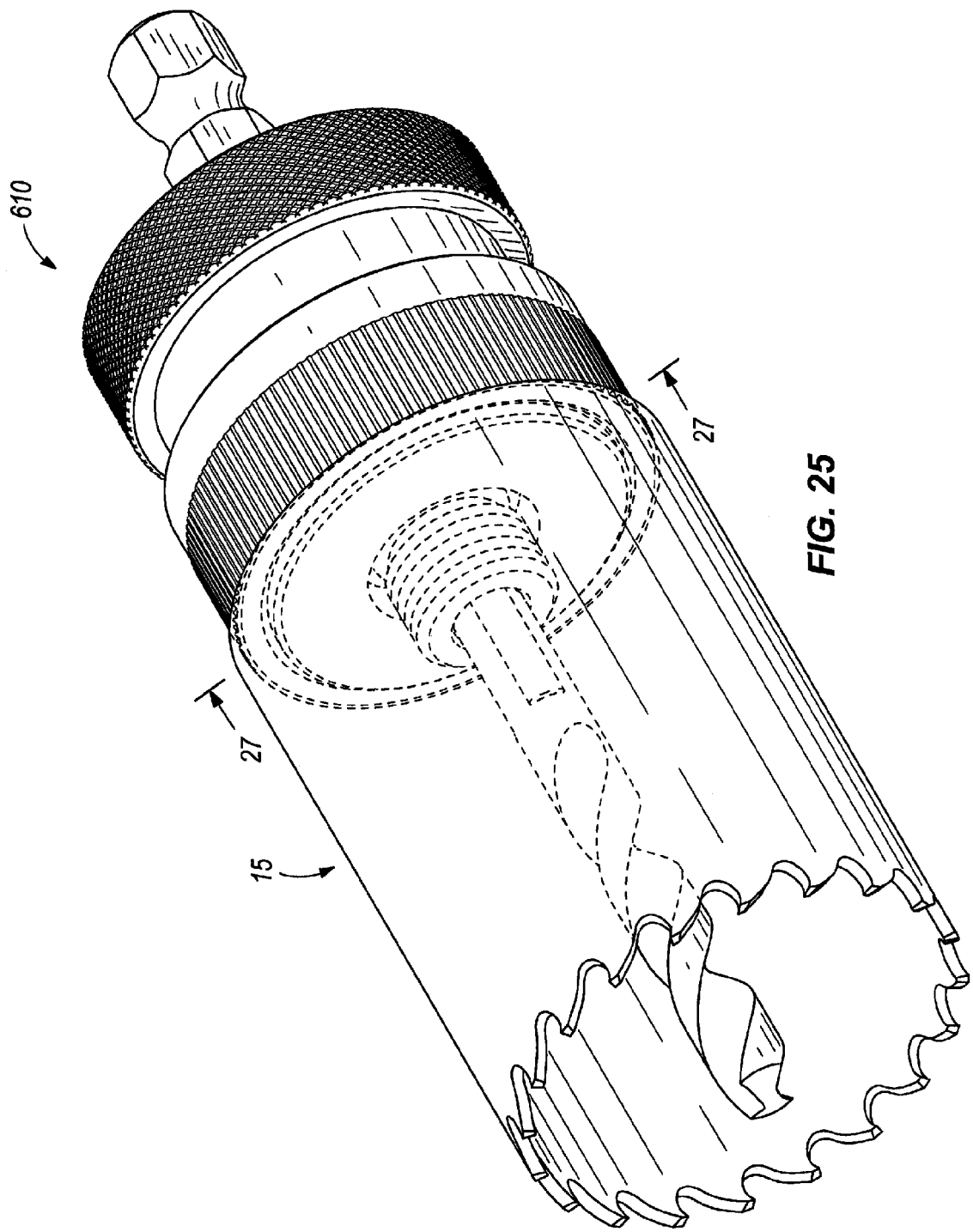
FIG. 25 is a perspective view of a power tool arbor system with an attached hole saw according to another embodiment of the invention.

FIG. 25 illustrates a power tool arbor system 610 according to another embodiment of the invention. The arbor system 610 is similar to the arbor system 10 illustrated in FIGS. 1-14 and operates in a substantially similar manner; therefore, like structure will accordingly be labeled with like reference numerals. Discussion of the arbor system 610 will be limited to the features that differ from those of the arbor system 10 discussed above.

Figure 26:
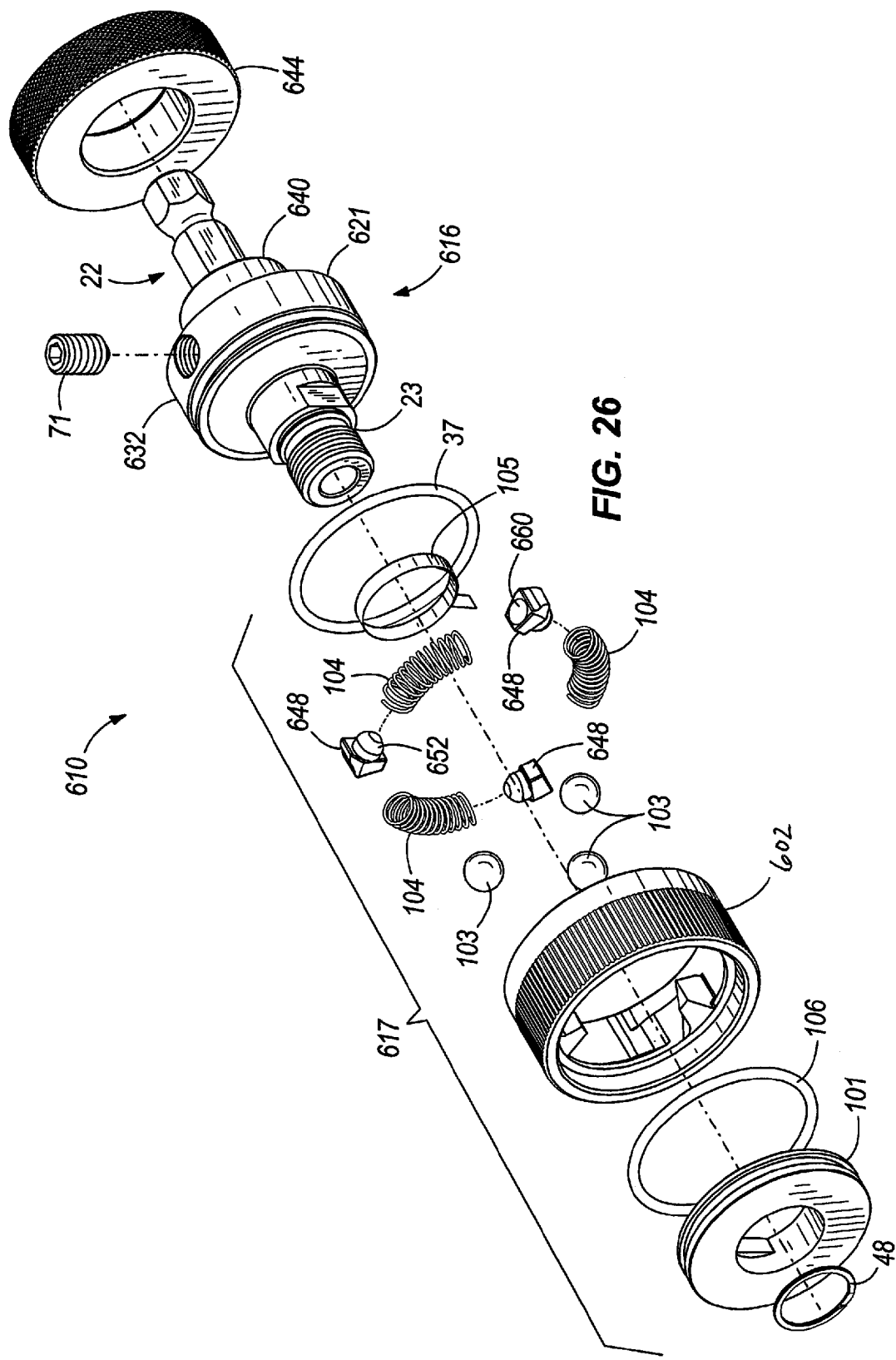
FIG. 26 is an exploded view of the power tool arbor system shown in FIG. 25.

Referring to FIG. 26, the power tool arbor system 610 includes an arbor 616 and a release mechanism 617 to facilitate removal of the power tool accessory 15 (shown in FIG. 25) from the arbor 616 after use. The arbor 616 is substantially similar to the arbor 16 described above with reference to arbor system 10. The arbor 616 includes a body 621, the first projecting end 22, the second projecting end 23, and a peripheral surface 632 on the body 621. In the illustrated embodiment, the peripheral surface 632 of the body 621 is not knurled or textured. Rather the body 621 includes a reduced diameter portion 640 adjacent the first projecting end 22. The reduced diameter portion 640 is adapted to mate with a collar 644 having a knurled or textured peripheral surface. The collar 644 may be secured to the reduced diameter portion 640 by any suitable means, including, for example, by interference fit, by adhesive bond, by welding, or by braze. The collar 644, when secured to the reduced diameter portion 640, provides a surface to facilitate gripping of the arbor 616 by a user. In further embodiments, the body 621 may include an exterior surface 632 that is knurled or otherwise textured to facilitate gripping by a user.

Figure 27:
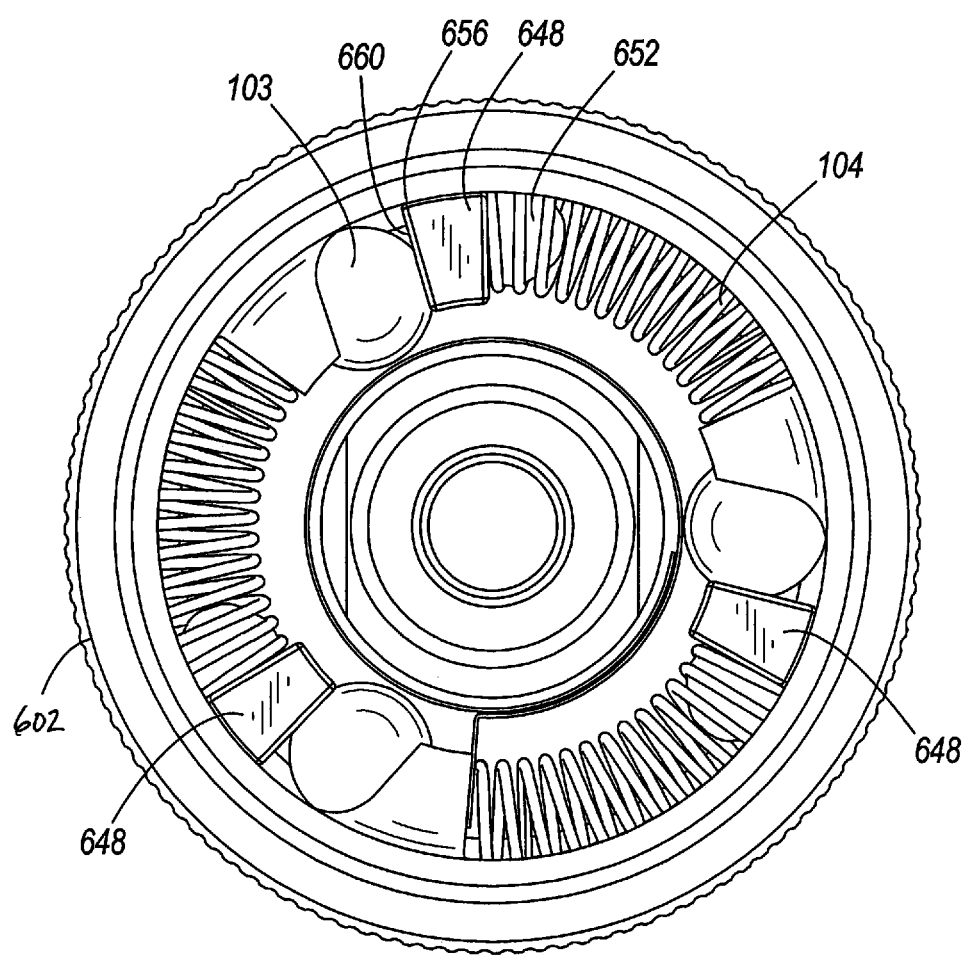
FIG. 27 is a cross-section view of the power tool system of FIG. 25 taken along line 27-27 in FIG. 25.

With further reference to FIG. 26, the release mechanism 617 includes the retention device 48, the friction member 101, an actuating member 602, roller elements 103, spring elements 104, the radially acting spring 105, and the sealing elements 37, 106. The release mechanism 617 further includes a plurality of spring pins 648. As illustrated in FIG. 27, a first end 652 of each spring pin 648 is partially inserted into the respective spring element 104. A second end 656 of each spring pin 648 includes a face 660 that contacts the respective roller element 103. The face 660 of the spring pin 648 includes a concavity that aligns the spring pin 648, and hence the spring element 104, with the roller element 103. The spring pin 648 helps to direct the forces generated by each spring element 104 to the roller element 103. In the illustrated embodiment, there are an equal number of spring pins 648 as there are roller elements 103 or spring elements 104. In further embodiments, the release mechanism 617 may not include a number of spring pins 648 equal to the number of roller elements 103 or spring elements 104. In such embodiments, the release mechanism 617 may include fewer or more spring pins 648.

Figure 28:
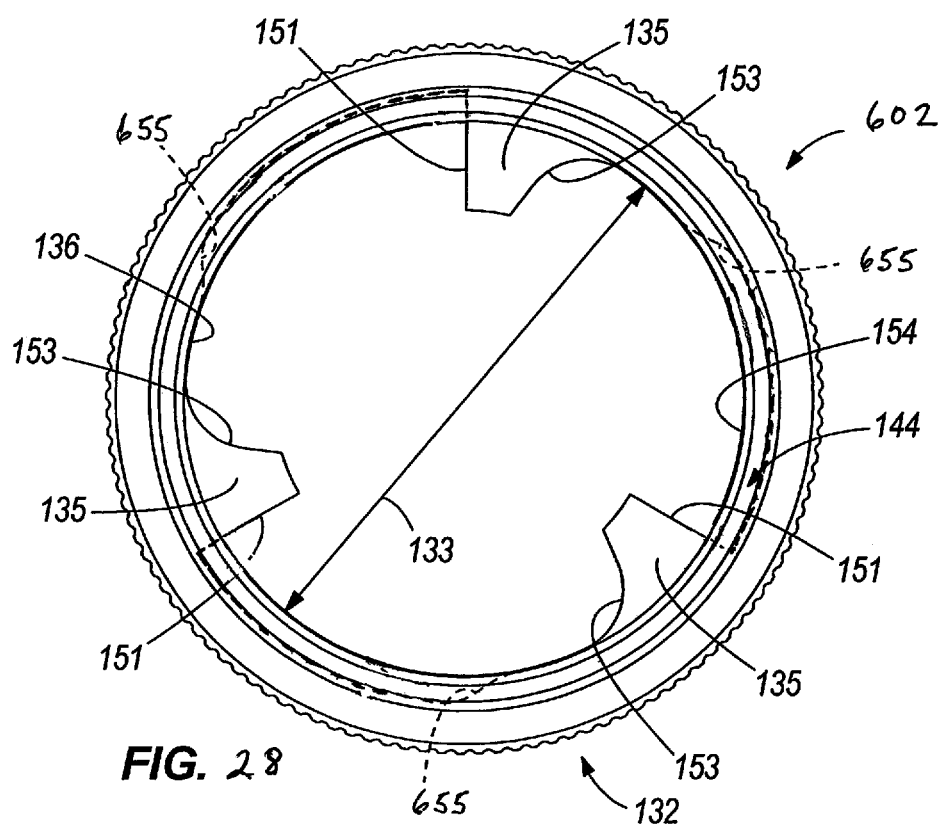
FIG. 28 is a view of the actuating member of the power tool arbor system shown in FIG. 26.

Referring to FIG. 28, the actuating member 602 is substantially similar to the actuating member 102 described above with reference to arbor system 10. Accordingly, discussion of the actuating member 602 will be limited to the features that differ from the actuating member 102. In the illustrated embodiment, the actuating member 602 includes a cavity 655 instead of the cavity 155 associated with the actuating member 102. The cavity 655 is located between adjacent tangs 135, with an end of the cavity 655 located at the spring surface 151 of a tang 135. The actuating member 602 and the cavity 655 function in a similar manner to the actuating member 102 and the cavity 155; in that the actuating member 602 and the cavity 655 facilitate the release and removal of an attached power tool accessory 15 from the power tool arbor system 10. Once the actuating member 602 is rotated such that each of the cavities 655 are radially aligned with the respective roller element 103, the outward radial force of the radially acting spring 105 forces the roller element 103 into the aligned cavity 655. The roller element 103 remains within the cavity 655 as long as the actuating member 602 is held in a rotated position, or if the actuating member 602 is further rotated in the first direction.

In all other respects, the release mechanism 617 of the arbor system 610 is substantially similar to the release mechanism 17 discussed above with respect to the arbor system 10.

Accordingly, operation of the power tool arbor 610 is substantially similar to the described operation of the power tool arbor 10.

Although the invention has been described in detail with reference to certain preferred embodiments, variations and modifications exist within the scope and spirit of one or more independent aspects of the invention as described.

What is claimed is:

1. A power tool arbor assembly comprising:
   an arbor having a body with an axis, a first end adapted to couple with a rotating tool and a second end for attaching a power tool accessory;
   an actuating member located at the second end of the arbor;
   a friction member located at the second end of the arbor, the friction member including a first surface for contacting a surface of the power tool accessory and the friction member being axially movable along the second end of the arbor,
   wherein the friction member has a first axial position when no power tool accessory is attached to the second end of the arbor,
   the friction member being moveable toward the first end of the arbor from the first axial position to a second axial position in response to contact between the surface of the power tool accessory and the first surface of the friction member, and
   the friction member being moveable toward the first end of the arbor from the second axial position to a third axial position when the actuating member is actuated;
   a roller element located between the friction member and the body of the arbor; and
   a radially acting spring located at the second end of the arbor, wherein the radially acting spring biases the roller element away from the axis of the body.

2. The power tool arbor assembly of claim 1, wherein the actuating member is axially moveable toward the first end from a first position to a second position in response to contact between the surface of the power tool accessory and the first surface of the friction member.

3. The power tool arbor assembly of claim 2, wherein the actuating member is biased to the first position.

4. The power tool arbor assembly of claim 3, wherein the actuating member is rotated about the axis of the body from the second position to a third position to allow the friction member to move from the second axial position to the third axial position.

5. The power tool arbor assembly of claim 1, wherein the friction member is in contact with the roller element when the friction member is in the second axial position.

6. The power tool arbor assembly of claim 1, wherein the power tool accessory is a hole saw.

7. A power tool arbor assembly comprising:
   an arbor having a body with an axis, a first end adapted to couple with a rotating tool and a second end for attaching a power tool accessory;
   an actuating member located at the second end of the arbor;
   a friction member located at the second end of the arbor, the friction member including a first surface for contacting a surface of the power tool accessory and the friction member being axially movable along the second end of the arbor,
   wherein the friction member has a first axial position when no power tool accessory is attached to the second end of the arbor,
   the friction member being moveable toward the first end of the arbor from the first axial position to a second axial position in response to contact between the surface of the power tool accessory and the first surface of the friction member, and
   the friction member being moveable toward the first end of the arbor from the second axial position to a third axial position when the actuating member is actuated;
   a roller element located between the friction member and the body of the arbor;
   a compression spring located between the friction member and the body of the arbor, wherein the compression spring acts upon the roller element and the actuating member; and
   a spring pin between the compression spring and the roller element.

8. A power tool arbor assembly comprising:
   an arbor having a body with an axis, a first end adapted to couple with a rotating tool, and a second end for attaching a power tool accessory;
   an actuating member located at the second end of the arbor;
   a friction member located at the second end of the arbor, the friction member including a first surface for contacting a surface of the power tool accessory and the friction member being axially movable along the second end of the arbor,
   wherein the actuating member has a first position when no power tool accessory is attached to the second end,
   the actuating member being axially moveable toward the first end from the first position to a second position in response to contact between the surface of the power tool accessory and the first surface, and
   the actuating member is movable from the second position to a third position;
   a roller element located between the actuating member and the second end of the arbor; and
   a radially acting spring located at the second end of the arbor, wherein the radially acting spring biases the roller element radially away from the axis of the body.

9. The power tool arbor assembly of claim 8, wherein the actuating member is biased to the first position.

10. The power tool arbor assembly of claim 9, wherein the friction member is allowed to move axially toward the first end from the second axial position to a third axial position on the second end when the actuating member is rotated from the second position to the third position.

11. The power tool arbor assembly of claim 8, wherein the friction member moves axially toward the first end from a first axial position to a second axial position on the second end in response to contact between the surface of the power tool accessory and the first surface.

12. The power tool arbor assembly of claim 8, wherein the actuating member includes an inner surface having a tang extending radially inward from the inner surface and the inner surface defining a cavity.

13. The power tool arbor assembly of claim 12, further comprising a compression spring located within the cavity of the actuating member, wherein the compression spring biases the roller element toward the tang of the actuating member.

14. The power tool arbor assembly of claim 13, further comprising a spring pin supporting the compression spring within the actuating member.

15. The power tool arbor assembly of claim 8, wherein the power tool accessory is a hole saw.

16. A power tool arbor assembly comprising:
   an arbor having a body defining a longitudinal axis, a first end adapted to couple with a rotating tool and a second end for attaching a power tool accessory;

an actuating member located at the second end of the arbor, the actuating member including an inner surface defining a cavity and a tang extending radially inward towards the body;

a friction member located at the second end of the arbor, the friction member including a first surface for contacting a surface of the power tool accessory when the accessory is coupled to the arbor and the friction member being axially movable along the second end of the arbor;

a roller element positioned between the actuating member and the second end of the arbor;

a first spring positioned about the second end of the arbor, the first spring biasing the roller element radially away from the longitudinal axis of the body; and a second spring positioned within the cavity of the actuating member, the second spring seated between the tang and the roller element and biasing the roller element away from the tang, wherein the power tool assembly has a first state when a power tool accessory is removed from the second end of the arbor, the power tool assembly has a second state when the power tool accessory is coupled to the second end of the arbor, wherein in the second state the friction member and the actuating member are moved towards the first end of the arbor in response to contact between the surface of the power tool accessory and the first surface of the friction member, and the power tool assembly has a third state when the actuating member is actuated by a user, wherein in the third state the first spring biases the roller element into the cavity of the actuating member, which permits further axial movement of the friction member towards the first end of the arbor such that the friction member is moved out of contact with the power tool accessory.

17. The power tool arbor assembly of claim 16, wherein the power tool arbor assembly comprises more than one roller element, more than one second springs and more than one tang, and further wherein each of the second springs is seated between one of the rollers element and one of the tangs in order to bias the respective roller element away from one tang and towards an adjacent tang.

18. The power tool arbor assembly of claim 16, further comprising a sealing element between the actuating member and the friction member.

19. The power tool arbor assembly of claim 16, further comprising a sealing element between the actuating member and the body of the arbor.

20. The power tool arbor assembly of claim 16, further comprising a spring pin supporting the second spring within the actuating member.

21. The power tool arbor assembly of claim 16, wherein the power tool accessory is a hole saw.

* * * * *